US008140624B2

(12) United States Patent
Gingell et al.

(10) Patent No.: US 8,140,624 B2
(45) Date of Patent: Mar. 20, 2012

(54) AUTOMATED DEPLOYMENT AND CONFIGURATION OF APPLICATIONS IN AN AUTONOMICALLY CONTROLLED DISTRIBUTED COMPUTING SYSTEM

(75) Inventors: Robert A. Gingell, Sunnyvale, CA (US); Jeanne C. Ohren, Victoria, MN (US); Sanjay Radia, Fremont, CA (US); David A. Henseler, Maplewood, MN (US)

(73) Assignee: Computer Associates Think, Inc., Islandia, NY (US)

( * ) Notice: Subject to any disclaimer, the term of this patent is extended or adjusted under 35 U.S.C. 154(b) by 610 days.

(21) Appl. No.: 11/607,820

(22) Filed: Dec. 1, 2006

(65) Prior Publication Data
US 2007/0169049 A1 Jul. 19, 2007

Related U.S. Application Data

(60) Provisional application No. 60/741,531, filed on Dec. 1, 2005, provisional application No. 60/780,097, filed on Mar. 8, 2006.

(51) Int. Cl.
*G06F 15/16* (2006.01)
(52) U.S. Cl. ......................... 709/205; 709/201; 709/221
(58) Field of Classification Search ........... 709/201–203
See application file for complete search history.

(56) References Cited

U.S. PATENT DOCUMENTS

| | | | |
|---|---|---|---|
| 6,018,747 A | 1/2000 | Burns et al. | |
| 6,430,622 B1 | 8/2002 | Aiken, Jr. et al. | |
| 6,535,915 B1 | 3/2003 | Valys et al. | |
| 6,535,977 B1 | 3/2003 | Holle et al. | |
| 6,775,423 B2 | 8/2004 | Kulkarni et al. | |
| 6,775,829 B1 | 8/2004 | Kroening | |
| 6,865,737 B1 | 3/2005 | Lucas et al. | |
| 7,055,040 B2 | 5/2006 | Klemba et al. | |
| 7,284,054 B2 | 10/2007 | Radhakrishnan | |
| 2002/0156877 A1 | 10/2002 | Lu et al. | |
| 2003/0046396 A1 | 3/2003 | Richter et al. | |

(Continued)

FOREIGN PATENT DOCUMENTS

WO WO/03/085526 A1 10/2003

(Continued)

OTHER PUBLICATIONS

*Preinstalling Microsoft Windows XP by Using the OEM Preinstallation Kit, Part 1*, XP-002301441, Apr. 4, 2003, 24 pages.
R. Mark Koan et al., *It Takes a Village to Build an Image*, XP-002384269, 2003, pp. 200-207.

(Continued)

*Primary Examiner* — Ian N Moore
*Assistant Examiner* — Jackie Zuniga
(74) *Attorney, Agent, or Firm* — Baker Botts L.L.P.

(57) ABSTRACT

A distributed computing system conforms to a multi-level, hierarchical organizational model. One or more control nodes provide for the efficient and automated allocation and management of computing functions and resources within the distributed computing system in accordance with the organization model. A user interacts with the control nodes to logically define the hierarchical organization of distributed computing system. The control node includes an automation subsystem having one or more rule engines that provide autonomic control of the application nodes in accordance with a set of one or more rules. An application governor uses a set of software image objects to configure an application on an application node. Each of the application software image objects share a common interface and are therefore interchangeable.

26 Claims, 25 Drawing Sheets

U.S. PATENT DOCUMENTS

| | | |
|---|---|---|
| 2003/0051020 A1 | 3/2003 | Kadam et al. |
| 2003/0131078 A1 | 7/2003 | Scheer et al. |
| 2003/0177176 A1 | 9/2003 | Hirschfeld et al. |
| 2004/0088694 A1 | 5/2004 | Ho |
| 2004/0181794 A1 | 9/2004 | Coleman et al. |
| 2004/0187104 A1 | 9/2004 | Sardesai et al. |
| 2004/0205101 A1* | 10/2004 | Radhakrishnan ............. 709/200 |
| 2004/0260734 A1 | 12/2004 | Ren et al. |
| 2005/0005200 A1* | 1/2005 | Matena et al. .................. 714/38 |
| 2005/0027831 A1 | 2/2005 | Anderson et al. |
| 2005/0091348 A1 | 4/2005 | Ferri et al. |
| 2005/0114439 A1 | 5/2005 | Hodges et al. |
| 2005/0114860 A1 | 5/2005 | Lin et al. |
| 2005/0165921 A1 | 7/2005 | Abadir et al. |
| 2005/0165925 A1 | 7/2005 | Dan et al. |
| 2005/0193265 A1 | 9/2005 | Lin et al. |
| 2006/0173895 A1 | 8/2006 | Engquist et al. |
| 2006/0173993 A1 | 8/2006 | Henseler et al. |
| 2006/0174238 A1 | 8/2006 | Henseler et al. |
| 2006/0200494 A1 | 9/2006 | Sparks |

FOREIGN PATENT DOCUMENTS

| | | |
|---|---|---|
| WO | WO/2006/081503 | 8/2006 |
| WO | WO 2006/106142 A1 | 10/2006 |
| WO | WO 2007/064799 A1 | 6/2007 |

OTHER PUBLICATIONS

Notification of Transmittal of the International Preliminary Report on Patentability (IPRP) for counterpart application No. PCT/US2006/045938, dated Mar. 12, 2008, (15 pages).

PCT International Search Report and PCT Written Opinion from corresponding PCT Application No. PCT/US2006/045938, mailed Mar. 30, 2007 (13 pages).

U.S. Appl. No. 11/694,483, filed Mar. 30, 2007, entitled, "Distributed Computing System Having Autonomic Deployment of Virtual Machine Disk Images", Sundar et al.

U.S. Appl. No. 11/823,174, filed Jun. 27, 2007, entitled, "Autonomic Control of a Distributed Computing System Using Finite State Machines", Gingell et al.

U.S. Appl. No. 11/823,356, filed Jun. 27, 2007, entitled, "Autonomic Control of a Distributed Computing System Using Dynamically Assembled Resource Chains", Gingell et al.

U.S. Appl. No. 11/046,133, filed Jun. 27, 2007, entitled, "Management of Software Images for Computing Nodes of a Distributed Computing System", Henseler et al.

U.S. Appl. No. 11/046,152, filed Jun. 27, 2007, entitled, "Updating Software Images Associated with a Distributed Computing System", Henseler et al.

* cited by examiner

| APPLICATION `360` | APPLICATION NODES `362` | SERVICES `364` | NODE MONITORED VALUES `366` | SERVICE MONITORED ATTRIBUTES `368` | SERVICE LEVELS `370` | DEPLOYMENT CONSTRAINTS `372` |
|---|---|---|---|---|---|---|
| Name= DataDomain<br><br>adminIP= "172.31.64.201"<br><br>adminPort= "1100"<br><br>adminTier= "Web Admin"<br><br>clusterName= "PathCluster"<br><br>expectedStartupDelay=120<br><br>loadDelay=120<br><br>maxNodes=2<br><br>minNodes=1 | | name="AI Design-time" path="/lib/ai-designtime.ear" | | | | |
| | IP= 172.31.64.201<br>Name= managedServer_0 | name="System EJBs" path="/lib/ejbs.ear" | name= Load5Average | name= PendRequests | attribute= "BusyThread-Percentage" expression= "(ExecuteThreadTotalCount-ExecuteThreadIdleCount)*100/ExecuteThreadTotalCount" frequency="15" maxThreshold="20.0" minThreshold="5.0" period="30" | attribute= "LoadAverage" expression= "Load5Average" frequency="15" maxThreshold="4" minThreshold="-1" period="15" |
| | | name="Worklist Worker User Interface" path="/lib/worklist/worklist.ear" | name= PercentFree-Memory | name= ExecuteThread-IdleCount | | attribute= "FreeMemory" expression= "PercentMemoryFree*100" frequency="15" maxThreshold="-1" minThreshold="1" period="60" |
| | IP= 172.31.64.202<br>Name= managedServer_1 | name="DBMS_A DK" path="/lib/DBMS_ADK.ear" | | name= ExecuteThread-TotalCount | attribute= "PendingRequests" expression= "PendingRequests" frequency="15" maxThreshold="20" minThreshold="5" period="30" | |
| | | name="UserApp" path="/user_projects/domains/userApp.ear" | | | | |
| name= Portal-Domain<br>...... | | | | | | |

FIG. 22

AUTOMATED DEPLOYMENT AND CONFIGURATION OF APPLICATIONS IN AN AUTONOMICALLY CONTROLLED DISTRIBUTED COMPUTING SYSTEM

This application claims the benefit of U.S. provisional Application Ser. No. 60/741,531, filed Dec. 1, 2005, the entire content of which is incorporated herein by reference. In addition, this application claims the benefit of U.S. provisional Application Ser. No. 60/780,097, filed Mar. 8, 2006, the entire content of which is corporated herein by reference.

TECHNICAL FIELD

The invention relates to computing environments and, more specifically, to distributed computing systems.

BACKGROUND

Distributed computing systems are increasingly being utilized to support business as well as technical applications. Typically, distributed computing systems are constructed from a collection of computing nodes that combine to provide a set of processing services to implement the distributed computing applications. Each of the computing nodes in the distributed computing system is typically a separate, independent computing device interconnected with each of the other computing nodes via a communications medium, e.g., a network.

One challenge with distributed computing systems is the organization, deployment and administration of such a system within an enterprise environment. For example, it is often difficult to manage the allocation and deployment of enterprise computing functions within the distributed computing system. An enterprise, for example, often includes several business groups, and each group may have competing and variable computing requirements.

SUMMARY

In general, the invention is directed to a distributed computing system that conforms to a multi-level, hierarchical organizational model. One or more control nodes provide for the efficient and automated allocation and management of computing functions and resources within the distributed computing system in accordance with the organization model.

As described herein, the model includes four distinct levels: fabric, domains, tiers and nodes that provide for the logical abstraction and containment of the physical components as well as system and service application software of the enterprise. A user, such as a system administrator, interacts with the control nodes to logically define the hierarchical organization of the distributed computing system. The control nodes are responsible for all levels of management in accordance with the model, including fabric management, domain creation, tier creation and node allocation and deployment.

In one embodiment, a method comprises autonomically determining whether to execute a top-level software application on an application node in a set of application nodes in a distributed computing system based on status data from the application nodes. The method further comprises identifying a set of software applications that constitute a stack of software applications that, when executed, collaborate to provide an operating environment for the top-level software application. The plurality of software resources are identified when it is determined that the software application is to be executed to the application node. The method also comprise executing instances of each of the software application in the identified stack and the software application on the application node.

In another embodiment, a distributed computing system comprises an automation infrastructure to determine whether to execute a top-level software application on an application node in a set of application nodes in a distributed computing system based on status data from the application nodes. The system also comprises an application governor to identify a set of software applications that constitute a stack of software applications that, when executed, collaborate to provide an operating environment for the top-level software application. The plurality of software resources are identified when it is determined that the software application is to be executed to the application node. The application node executes instances of each of the software application in the identified stack and the software application on the application node.

In another embodiment, the invention is directed to a computer-readable medium comprising instructions. The instructions cause the processor to autonomically determine whether to execute a top-level software application on an application node in a set of application nodes in a distributed computing system based on status data from the application nodes. The instructions further cause the processor identify a set of software applications that constitute a stack of software applications that, when executed, collaborate to provide an operating environment for the top-level software application. The plurality of software resources are identified when it is determined that the software application is to be executed to the application node. The instructions cause the processor to direct the application governor to instruct the application node to execute instances of each of the software application in the identified stack and the software application.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 9 is a screen illustration of an exemplary user interface for viewing and identify properties of a computing node.

FIG. 10 is a screen illustration of an exemplary user interface for viewing software images.

FIG. 11 is a screen illustration of an exemplary user interface for viewing a hardware inventory report.

FIG. 22 is a flowchart illustrating an exemplary mode of initiating a control node utilizing an application matrix.

DETAILED DESCRIPTION

Figure 1:
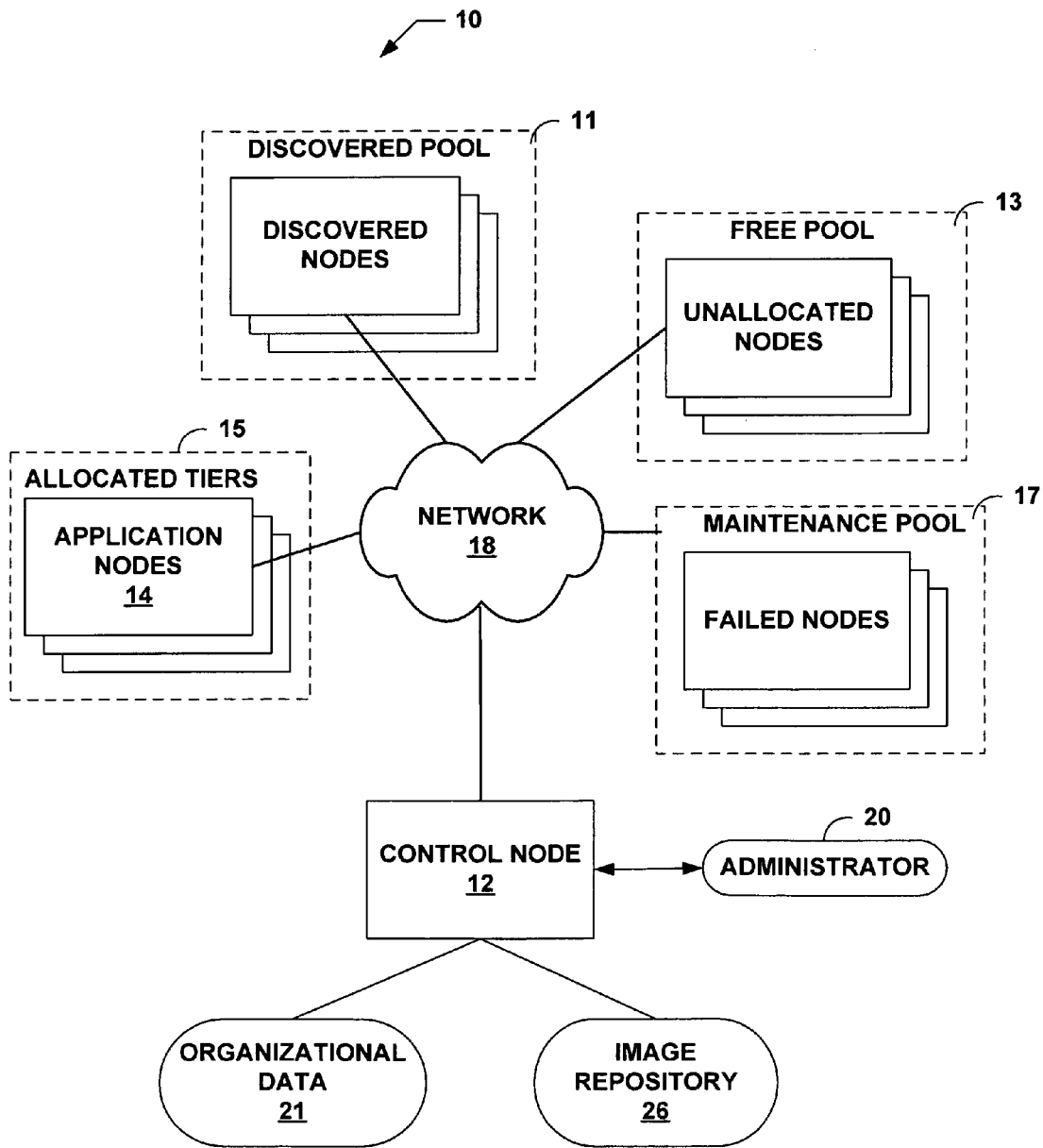
FIG. 1 is a block diagram illustrating a distributed computing system constructed from a collection of computing nodes.

FIG. 1 is a block diagram illustrating a distributed computing system 10 constructed from a collection of computing nodes. Distributed computing system 10 may be viewed as a collection of computing nodes operating in cooperation with each other to provide distributed processing.

In the illustrated example, the collection of computing nodes forming distributed computing system 10 are logically grouped within a discovered pool 11, a free pool 13, an allocated tiers 15 and a maintenance pool 17. In addition, distributed computing system 10 includes at least one control node 12.

Within distributed computing system 10, a computing node refers to the physical computing device. The number of computing nodes needed within distributed computing system 10 is dependent on the processing requirements. For example, distributed computing system 10 may include 8 to 512 computing nodes or more. Each computing node includes one or more programmable processors for executing software instructions stored on one or more computer-readable media.

Discovered pool 11 includes a set of discovered nodes that have been automatically "discovered" within distributed computing system 10 by control node 12. For example, control node 12 may monitor dynamic host communication protocol (DHCP) leases to discover the connection of a node to network 18. Once detected, control node 12 automatically inventories the attributes for the discovered node and reassigns the discovered node to free pool 13. The node attributes identified during the inventory process may include a CPU count, a CPU speed, an amount of memory (e.g., RAM), local disk characteristics or other computing resources. Control node 12 may also receive input identifying node attributes not detectable via the automatic inventory, such as whether the node includes I/O, such as HBA. Further details with respect to the automated discovery and inventory processes are described in U.S. patent application Ser. No. 11/070,851, entitled "AUTOMATED DISCOVERY AND INVENTORY OF NODES WITHIN AN AUTONOMIC DISTRIBUTED COMPUTING SYSTEM," filed Mar. 2, 2005, the entire content of which is hereby incorporated by reference.

Free pool 13 includes a set of unallocated nodes that are available for use within distributed computing system 10. Control node 12 may dynamically reallocate an unallocated node from free pool 13 to allocated tiers 15 as an application node 14. For example, control node 12 may use unallocated nodes from free pool 13 to replace a failed application node 14 or to add an application node to allocated tiers 15 to increase processing capacity of distributed computing system 10.

In general, allocated tiers 15 include one or more tiers of application nodes 14 that are currently providing a computing environment for execution of user software applications. In addition, although not illustrated separately, application nodes 14 may include one or more input/output (I/O) nodes. Application nodes 14 typically have more substantial I/O capabilities than control node 12, and are typically configured with more computing resources (e.g., processors and memory). Maintenance pool 17 includes a set of nodes that either could not be inventoried or that failed and have been taken out of service from allocated tiers 15.

Control node 12 provides the system support functions for managing distributed computing system 10. More specifically, control node 12 manages the roles of each computing node within distributed computing system 10 and the execution of software applications within the distributed computing system. In general, distributed computing system 10 includes at least one control node 12, but may utilize additional control nodes to assist with the management functions.

Other control nodes 12 (not shown in FIG. 1) are optional and may be associated with a different subset of the computing nodes within distributed computing system 10. Moreover, control node 12 may be replicated to provide primary and backup administration functions, thereby allowing for graceful handling a failover in the event control node 12 fails.

Network 18 provides a communications interconnect for control node 12 and application nodes 14, as well as discovered nodes, unallocated nodes and failed nodes. Communications network 18 permits internode communications among the computing nodes as the nodes perform interrelated operations and functions. Communications network 18 may comprise, for example, direct connections between one or more of the computing nodes, one or more customer networks maintained by an enterprise, local area networks (LANs), wide area networks (WANs) or a combination thereof. Communications network 18 may include a number of switches, routers, firewalls, load balancers, and the like.

In one embodiment, each of the computing nodes within distributed computing system 10 executes a common general-purpose operating system. One example of a general-purpose operating system is the Windows™ operating system provided by Microsoft Corporation. In some embodiments, the general-purpose operating system such as the Linux kernel may be used.

In the example of FIG. 1, control node 12 is responsible for software image management. The term "software image" refers to a complete set of software loaded on an individual computing node to provide an execution environment for one or more applications. The software image including the operating system and all boot code, middleware files, and may include application files. As described below embodiments of the invention provide application-level autonomic control over the deployment, execution and monitoring of applications onto software images associated with application nodes 14.

System administrator 20 may interact with control node 12 and identify the particular types of software images to be associated with application nodes 14. Alternatively, administration software executing on control node 12 may automatically identify the appropriate software images to be deployed to application nodes 14 based on the input received from system administrator 20. For example, control node 12 may determine the type of software image to load onto an application node 14 based on the functions assigned to the node by system administrator 20. Application nodes 14 may be divided into a number of groups based on their assigned functionality. As one example, application nodes 14 may be divided into a first group to provide web server functions, a second group to provide business application functions and a third group to provide database functions. The application nodes 14 of each group may be associated with different software images.

Control node 12 provides for the efficient allocation and management of the various software images within distributed computing system 10. In some embodiments, control node 12 generates a "golden image" for each type of software image that may be deployed on one or more of application nodes 14. As described herein, the term "golden image" refers to a reference copy of a complete software stack for providing an execution environment for applications.

System administrator 20 may create a golden image by installing an operating system, middleware and software applications on a computing node and then making a complete copy of the installed software. In this manner, a golden image may be viewed as a "master copy" of the software image for a particular computing function. Control node 12 maintains a software image repository 26 that stores the golden images associated with distributed computing system 10.

Control node 12 may create a copy of a golden image, referred to as an "image instance," for each possible image instance that may be deployed within distributed computing system 10 for a similar computing function. In other words, control node 12 pre-generates a set of K image instances for a golden image, where K represents the maximum number of image instances for which distributed computing system 10 is configured for the particular type of computing function. For a given computing function, control node 12 may create the complete set of image instance even if not all of the image instances will be initially deployed. Control node 12 creates different sets of image instances for different computing functions, and each set may have a different number of image instances depending on the maximum number of image instances that may be deployed for each set. Control node 12 stores the image instances within software image repository 26. Each image instance represents a collection of bits that may be deployed on an application node.

Further details of software image management are described in co-pending U.S. patent application Ser. No. 11/046,133, entitled "MANAGEMENT OF SOFTWARE IMAGES FOR COMPUTING NODES OF A DISTRIBUTED COMPUTING SYSTEM," filed Jan. 28, 2005 and co-pending U.S. patent application Ser. No. 11/046,152, entitled "UPDATING SOFTWARE IMAGES ASSOCIATED WITH A DISTRIBUTED COMPUTING SYSTEM," filed Jan. 28, 2005, each of which is incorporated herein by reference in its entirety.

In general, distributed computing system 10 conforms to a multi-level, hierarchical organizational model that includes four distinct levels: fabric, domains, tiers and nodes. Control node 12 is responsible for all levels of management, including fabric management, domain creation, tier creation and node allocation and deployment.

As used herein, the "fabric" level generally refers to the logical constructs that allow for definition, deployment, partitioning and management of distinct enterprise applications. In other words, fabric refers to the integrated set of hardware, system software and application software that can be "knitted" together to form a complete enterprise system. In general, the fabric level consists of two elements: fabric components or fabric payload. Control node 12 provides fabric management and fabric services as described herein.

In contrast, a "domain" is a logical abstraction for containment and management within the fabric. The domain provides a logical unit of fabric allocation that enables the fabric to be partitioned amongst multiple uses, e.g. different business services.

Domains are comprised of tiers, such as a 4-tier application model (web server, application server, business logic, persistence layer) or a single tier monolithic application. Fabric domains contain the free pool of devices available for assignment to tiers.

A tier is a logically associated group of fabric components within a domain that share a set of attributes: usage, availability model or business service mission. Tiers are used to define structure within a domain e.g. N-tier application, and each tier represents a different computing function. A user, such as administrator 20, typically defines the tier structure within a domain. The hierarchical architecture may provide a high degree of flexibility in mapping customer applications to logical models which run within the fabric environment. The tier is one construct in this modeling process and is the logical container of application resources.

The lowest level, the node level, includes the physical components of the fabric. This includes computing nodes that, as described above, provide operating environments for system applications and enterprise software applications. In addition, the node level may include network devices (e.g., Ethernet switches, load balancers and firewalls) used in creating the infrastructure of network 18. The node level may further include network storage nodes that are network connected to the fabric.

System administrator 20 accesses administration software executing on control node 12 to logically define the hierarchical organization of distributed computing system 10. For example, system administrator 20 may provide organizational data 21 to develop a model for the enterprise and logically define the enterprise fabric. System administrator 20 may, for instance, develop a model for the enterprise that includes a number of domains, tiers, and node slots hierarchically arranged within a single enterprise fabric.

More specifically, system administrator 20 defines one or more domains that each correspond to a single enterprise application or service, such as a customer relation management (CRM) service. System administrator 20 further defines one or more tiers within each domain that represent the functional subcomponents of applications and services provided by the domain. As an example, system administrator 20 may define a storefront domain within the enterprise fabric that includes a web tier, an application tier and a database tier. In this manner, distributed computing system 10 may be configured to automatically provide web server functions, business application functions and database functions.

For each of the tiers, control node 12 creates a number of "node slots" equal to the maximum number of application nodes 14 that may be deployed. In general, each node slot represents a data set that describes specific information for a corresponding node, such as software resources for a physical node that is assigned to the node slot. The node slots may, for instance, identify a particular software image instance associated with an application node 14 as well as a network address associated with that particular image instance.

In this manner, each of the tiers include one or more node slots that reference particular software image instances to boot on the application nodes 14 to which each software image instance is assigned. The application nodes 14 to which control node 12 assigns the image instances temporarily inherit the network address assigned to the image instance for as long as the image instance is deployed on that particular application node. If for some reason the image instance is moved to a different application node 14, control node 12A moves the network address to that new application node.

System administrator 20 may further define specific node requirements for each tier of the fabric. For example, the node requirements specified by system administrator 20 may include a central processing unit (CPU) count, a CPU speed, an amount of memory (e.g., RAM), local disk characteristics and other hardware characteristics that may be detected on the individual computing nodes. System administrator 20 may also specify user-defined hardware attributes of the computing nodes, such as whether I/O (like HBA) is required. The user-defined hardware attributes are typically not capable of detection during an automatic inventory. In this manner, system administrator 20 creates a list of attributes that the tier requires of its candidate computing nodes. In addition, particular node requirements may be defined for software image instances.

In addition to the node requirements described above, system administrator 20 may further define policies that are used when re-provisioning computing nodes within the fabric. System administrator 20 may define policies regarding tier characteristics, such as a minimum number of nodes a tier requires, an indication of whether or not a failed node is dynamically replaced by a node from free pool 13, a priority for each tier relative to other tiers, an indication of whether or not a tier allows nodes to be re-provisioned to other tiers to satisfy processing requirements by other tiers of a higher priority or other policies. Control node 12 uses the policy information input by system administrator 20 to re-provision computing nodes to meet tier processing capacity demands.

After receiving input from system administrator 20 defining the architecture and policy of the enterprise fabric, control node 12 identifies unallocated nodes within free pool 13 that satisfy required node attributes. Control node 12 automatically assigns unallocated nodes from free pool 13 to respective tier node slots of a tier. As will be described in detail herein, in one embodiment, control node 12 may assign computing nodes to the tiers in a "best fit" fashion. Particularly, control node 12 assigns computing nodes to the tier whose node attributes most closely match the node requirements of the tier as defined by administrator 20. The assignment of the computing nodes may occur on a tier-by-tier basis beginning with a tier with the highest priority and ending with a tier with the lowest priority. Alternatively, or in addition, assignment of computing nodes may be based on dependencies defined between tiers.

As will be described in detail below, control node 12 may automatically add unallocated nodes from free pool 13 to a tier when more processing capacity is needed within the tier, remove nodes from a tier to the free pool when the tier has excess capacity, transfer nodes from tier to tier to meet processing demands, or replace failed nodes with nodes from the free pool. Thus, computing resources, i.e., computing nodes, may be automatically shared between tiers and domains within the fabric based on user-defined policies to dynamically address high-processing demands, failures and other events.

Distributed computing system 10 may provide one or more advantages. For example, the method of delivering computing as a service described here is based on providing application services independent of the computational infrastructure which generates the services. This is accomplished through a software infrastructure management facility which guarantees application service delivery by implementing service level automation.

This concept is itself based upon two concepts: The Service Delivery Model and Service Level Automation.

1. Service Delivery Model: Computing as a service, commonly referred to as utility computing, is based upon the ability of the consumer to be guaranteed availability of the quantity and quality of Applications Services (AS) required at the time and location necessary, independent of the type of service provided (e.g. audio, video, application programs, etc). This can only be achieved if the AS' delivered are provided independent of the location and condition of the physical and logical infrastructure which generates these services, limited only by total capability and capacity available. For the purpose of this disclosure this concept shall be referred to as the Service Delivery Model (SDM).

The physical and logical infrastructure facilities described in the preceding paragraph include all of the computing, storage and communication hardware and related software infrastructure; the application software and application containers; and all other enabling facilities and services which are part of the environment necessary to generate and deliver AS'. For the purpose this disclosure this concept shall be referred to as the Computing Infrastructure (CI).

2. Service Level Automation: In order to implement the SDM, an Infrastructure Management Facility (IMF) independent of the CI provides service level automation.

The purpose of the IMF is to implement the SDM for single and/or multiple application service flows for which it automatically and dynamically adjusts AS levels based on its policy automation facility. This facility shall automate AS' delivery based upon dynamically extensible policies which include but are not limited to: customer, location, priority, duration, date and time of day, service type, business demands and conditions, quantity and quality of service. The policy facility also enables independent control of the service by the service provider and by the consumer and allow the service consumer to in-turn be a service provider. Finally the IMF measures both efficiency and cost as reflected in the behavior of the product, namely the ability to make decisions taking into account the best uses of the resources on a dynamic basis in order to choose between functionally equivalent alternatives that make the best usage of the economics of the infrastructure at the time. For the purpose of this disclosure this concept shall be referred to as the Service Level Automation (SLA).

A key value of this concept is that it enables the separation of all aspects of the implementation of the CI from the delivery of application services. This allows the consumer of application services to not have to tradeoff: risk, business agility and cost. Its implementation is based upon a new abstraction which operates independent of existing software categories (e.g. applications, middleware, data base, operating systems and system management) which for the purposes of this disclosure shall be referred to as Metaware.

Embodiments of an autonomic distributed system are described that provide an Infrastructure Management Facility (IMF). The IMF is the Metaware which regulates the delivery of AS' through its SLA independent of the CI which generate the services, thus enabling the SDM. As application services are the result of applications running within the CI, it is the application service levels that are automated and made independent of all aspects of the CI within the limits of the capability and capacity available for delivery to the consumer. The SLA provides extensible, dynamic policy-driven control of service delivery for both service providers and service consumers, who themselves could also be service providers. In one embodiment, the IMF includes at least the following six functional design capabilities:

1. Application Service Independence: The basic concept which enables the IMF to delivery AS's is its ability to dynamically manage SLA independent of the CI. A key element of this is that applications themselves are independent and unmodified. This is accomplished through the IMF's ability to abstract the physical and logical computing infrastructure from the quantity and quality of application services generated. It is believed that without this capability it will not be possible to implement a fully general utility computing model.

2. Scale Independence: The incremental overhead of the IMF required of any server included in the CI described herein is independent of the number of servers being managed. Unless this requirement can be met, it will limit the scale of utility computing such that it will not be commercially viable for large scale utility computing.

3. Container Capacity Metering: Application service independence is achieved by dynamically metering the higher level software facilities of the CI which generate the application services, service flow and flux. For the purpose of this paper these facilities shall be referred to as Containers. Examples of containers include, but are not limited to, virtual machine managers, operating systems and web application servers. Furthermore, containers often contain other containers which in turn are managed by the IMF. The described embodiments of the system generalize the AS' independent of the type of infrastructure that generate these services.

4. Policy Automation: The IMF delivers the required SLA through its extensible policy management facility which dynamically adjusts the application service levels to implement user defined policy limited only by the capacity and capability of the available CI. This policy management facility is capable of providing guaranteed service levels for single and/or multiple application service flow which is automatically and dynamically adjusted based on user defined and extensible policies in response to changes in the environment. Examples of policies include, but are not limited to: customer, location, service type, cost and/or pricing, quantity and quality of service, priority, duration, date and time of day, business demands and conditions. The policy facility also allows the service provider to manage the delivery and meter the capacity that they delivery to individual customer's independent of the customer's ability to set and manage their own policy of how their capacity is utilized. Furthermore, customers of the services can themselves, in turn, be providers of services. This can be effectively done by leveraging Application Service Independence.

5. Dynamic Provisioning: The IMF described herein supports the ability to dynamically provision at boot and run time all software in order to support installation, capacity management, service levels and other policies, and software upgrade. It is believed that this is original in offering an application service independent CI architecture that employs separation for the purpose of creating flexibility in deployment of a single instance of a service.

6. Data Capture Capability: The IMF described herein acquires the data necessary to enable the service provider to implement the metering and auditing facilities necessary to control, audit, bill and account for services provided in complete detail. The ability to capture this data can also be used to educate the system about the performance characteristics of combinations of resources to allow it to improve the quality of its scheduling decisions over time, enhancing its ability to provide the requisite services with high efficiency.

The described system allows customers to conveniently acquire the guaranteed quantity and quality of AS's required at competitive market-driven rates with the ability to directly control the IMF's SLA capability in order to maximize their operations efficiency and effectiveness without having to tradeoff operation risk, cost and business agility.

Potential advantages include, but are not limited to:

1. Efficiency and Effectiveness: The customer need not manage the technology, and can focus on the automation of the application service to improve their efficiency and effectiveness without having to tradeoff operation risk, cost and business agility which is enabled through the IMF's SLA capability.

2. Capabilities & Convenience: By leveraging the Internet as a generic, global delivery facility and separating the CI from the AS delivery, the IMF simplifies the consumer's life in several ways:

i. Complexity: Eliminates the complexity of purchasing, installing, configuring, managing and administering the CI.

ii. Access: Provides ubiquitous access to the full range of computing services wherever and whenever desired from any client capable of accessing the Internet.

iii. Service Provider Independence: Consumers are free to change providers by simply transferring their software images to a new provider.

iv. Service Management: Enables the consumer to in turn provide services to their customers. For example a corporation would be able to regulate and bill their individual business units for the capacity consumed.

3. Cost: By logically abstracting the AS's from the CI, the IMF will enable a competitive service provider industry that includes:

i. Capacity Utilization: Customers may only be charged for capacity actually utilized. Today customers pay for the maximum capacity they would need at peak load.

ii. Choice of Suppliers: As the basic CI facilities will be generic, the customer may have choice of suppliers without the level lock-in current vendors enjoy. This is enabled through the IMF's image and policy management implementation which allows portability across service providers through simply transferring the files to the new provider and initiating it with the IMF Metaware. This will drive the pricing competition. The IMF's ability to provide AS's independent of the CI enables choice of service provider.

iii. Capital Expense Leverage: The customer need not have to own the capital equipment or software and the provider will be motivated to use the most cost effective components and amortize it across the customer base, the cost to the consumer will be much lower.

iv. Operations Expense Leverage: As the IMF automates most of the IT Operations functions, these costs will drop dramatically.

The IMF enables the implementation of a SDM based on SLA by service providers:

1. The IMF may be used to implement a service delivery model for AS's independent of the CI or of the service types provided. This capability enables the service provider to deliver SLA on a global basis utilizing generic CI for all types of digital services, including but not limited: traditional applications and service flow processing, digital audio and digital video services independently to any consumer type (e.g. individual, organization or corporation) as long as the consumer has access to sufficient capacity of broadband communications for the services levels require. This capability of the IMF also allows a service consumer to, in turn, be a service provider as well. This cannot be done without Application Service Independence.

2. The IMF described herein enables the service provider to meter the AS's delivered by the capacity of CI consumed by customer in order to: control, audit, bill and account for the services provided to multiple individual consumers. This capability represents a uniform model of SLA independent of the capacity of CI for all types of digital service (AS'). The resulting pricing model reflects the goal of utility computing by enabling the service provider to bill based upon any combination of AS delivery parameters including, but not limited to: customer, type of service, duration, date and/or time of day, location, point of delivery, quantity and quality of service and excess or reserved capacity.

3. The IMF also enables the service provider to leverage the economics of the SDM in several ways:

i. Utilization: By managing the CI with the IMF the service provider will be able to maintain much higher average utilization levels, thus dramatically reducing the amount of hardware purchased, software licensed and operations expenses.

ii. Global Service Demand Levels: Service demand for any organization varies primarily by local time of day. By leveraging the global reach of the internet the service provider will be able to much more effectively manage the utilization of the CI necessary to meet demand on a global "follow the sun" basis.

iii. Service Digitization: As all services will eventually be digital they can be delivered with a generic CI architecture.

iv. Value Added Services: Service providers will be free to provide any types and bundles of value added service beyond basic application services. A few examples include: Virtual Client: The bundle of personal computer services including applications, storage, security, administration and related services; Software as A Service; and Compliance Verification and Certification v. Hardware Commoditization: The ability to implement services utilizing generic low cost servers, storage facilities and network switches. These hardware elements are undergoing dramatic commoditization which allows for much lower capital expenses then in the past. This commoditization will continue for many years to come making capital expenses a much smaller part of the fixed costs for the service provider.

vi. Automation of Operations: One of the primary economic values of the IMF is that it automates most of the runtime operations costs of the CI. Operations expenses are the majority of the costs of today; once they are automated by the IMF these costs will be dramatically reduced.

Thus by leveraging the IMF's ability to dramatically reduce the capital and operations expenses, the service provider will be able to implement an SDM which will easily justify the consumers switching cost.

vii. Software Commoditization: Software pricing is being commoditized based upon several factors which will continue to accelerate. These factors include:

01. Service Oriented Architecture (SOA) which accelerates innovation, opens it to incremental independent innovation, eliminates down stream lock in by software vendors and makes it possible to use commodity servers to run applications that previously required large expensive servers. SOA also reduces complex applications to their most fundamental independently divisible functional services which will be the basis for the complete commoditization of software further leveraging the open source movement.

02. Open Source Software: Open source serves as an accelerator for the commoditization of all type of software by both compromising the pricing power of software and serving as a reusable model of software services which will further compromise the value of horizontal software services.

03. Good Enough: Application services are becoming more and more generic, thus accelerating their commoditization further in combination with SOA and Open Source.

Figure 2:
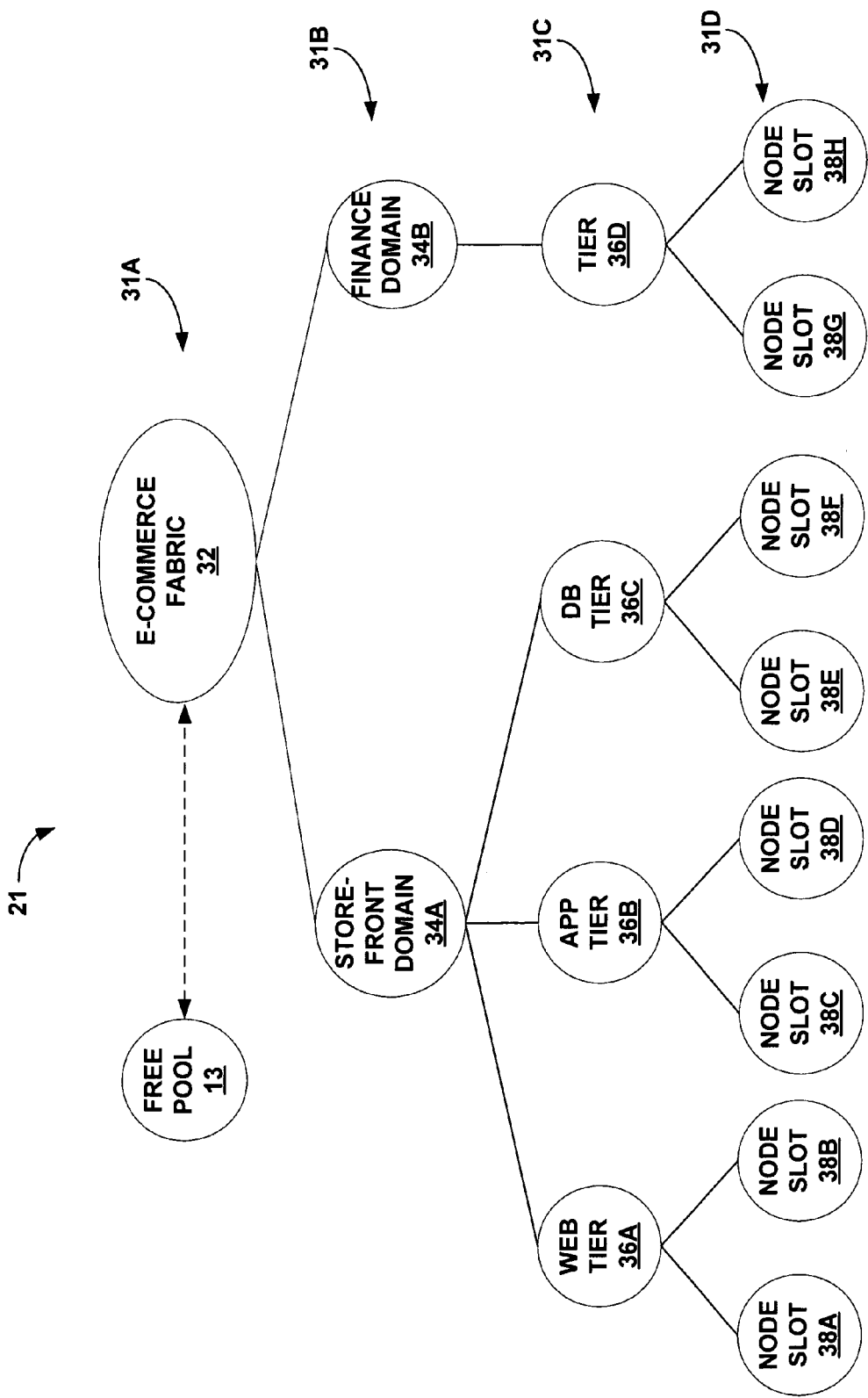
FIG. 2 is a schematic diagram illustrating an example of a model of an enterprise that logically defines an enterprise fabric.

FIG. 2 is a schematic diagram illustrating an example embodiment of organizational data 21 that defines a model logically representing an enterprise fabric in accordance with the invention. In the example illustrated in FIG. 2, control node 12 (FIG. 1) maintains organizational data 21 to define a simple e-commerce fabric 32.

In this example, e-commerce fabric 32 includes a storefront domain 34A and a financial planning domain 34B. Storefront domain 34A corresponds to the enterprise storefront domain and allows customers to find and purchase products over a network, such as the Internet. Financial planning domain 34B allows one or more employees to perform financial planning tasks for the enterprise.

Tier level 31C includes one or more tiers within each domain that represent the functional subcomponents of applications and services provided by the domain. For example, storefront domain 34A includes a web server tier (labeled "web tier") 36A, a business application tier (labeled "app tier") 36B, and a database tier (labeled "DB tier") 36C. Web server tier 36A, business application tier 36B and database tier 36C interact with one another to present a customer with an online storefront application and services. For example, the customer may interact with web server tier 36A via a web browser. When the customer searches for a product, web server tier 36A may interacts with business application tier 36B, which may in turn access a database tier 36C. Similarly, financial planning domain 34B includes a financial planning tier 36D that provides subcomponents of applications and services of the financial planning domain 34B. Thus, in this example, a domain may include a single tier.

Tier level 31D includes one or more logical node slots 38A-38H ("node slots 38") within each of the tiers. Each of node slots 38 include node specific information, such as software resources for an application node 14 that is assigned to a respective one of the node slots 38. Node slots 38 may, for instance, identify particular software image instances within image repository 26 and map the identified software image instances to respective application nodes 14. As an example, node slots 38A and 38B belonging to web server tier 36A may reference particular software image instances used to boot two application nodes 14 to provide web server functions. Similarly, the other node slots 38 may reference software image instances to provide business application functions, database functions, or financial application functions depending upon the tier to which the node slots are logically associated.

Although in the example of FIG. 2, there are two node slots 38 corresponding to each tier, the tiers may include any number of node slots depending on the processing capacity needed on the tier. Furthermore, not all of node slots 38 may be currently assigned to an application node 14. For example, node slot 28B may be associated with an inactive software image instance and, when needed, may be assigned to an application node 14 for deployment of the software image instance.

In this example, organizational data 21 associates free node pool 13 with the highest-level of the model, i.e., e-commerce fabric 32. As described above, control node 12 may automatically assign unallocated nodes from free node pool 13 to at least a portion of tier node slots 38 of tiers 36 as needed using the "best fit" algorithm described above or another algorithm. Additionally, control node 12 may also add nodes from free pool 13 to a tier when more processing capacity is needed within the tier, remove nodes from a tier to free pool 13 when a tier has excess capacity, transfer nodes from tier to tier to meet processing demands, and replace failed nodes with nodes from the free tier.

Although not illustrated, the model for the enterprise fabric may include multiple free node pools. For example, the model may associate free node pools with individual domains at the domain level or with individual tier levels. In this manner, administrator 20 may define policies for the model such that unallocated computing nodes of free node pools associated with domains or tiers may only be used within the domain or tier to which they are assigned. In this manner, a portion of the computing nodes may be shared between domains of the entire fabric while other computing nodes may be restricted to particular domains or tiers.

Figure 3:
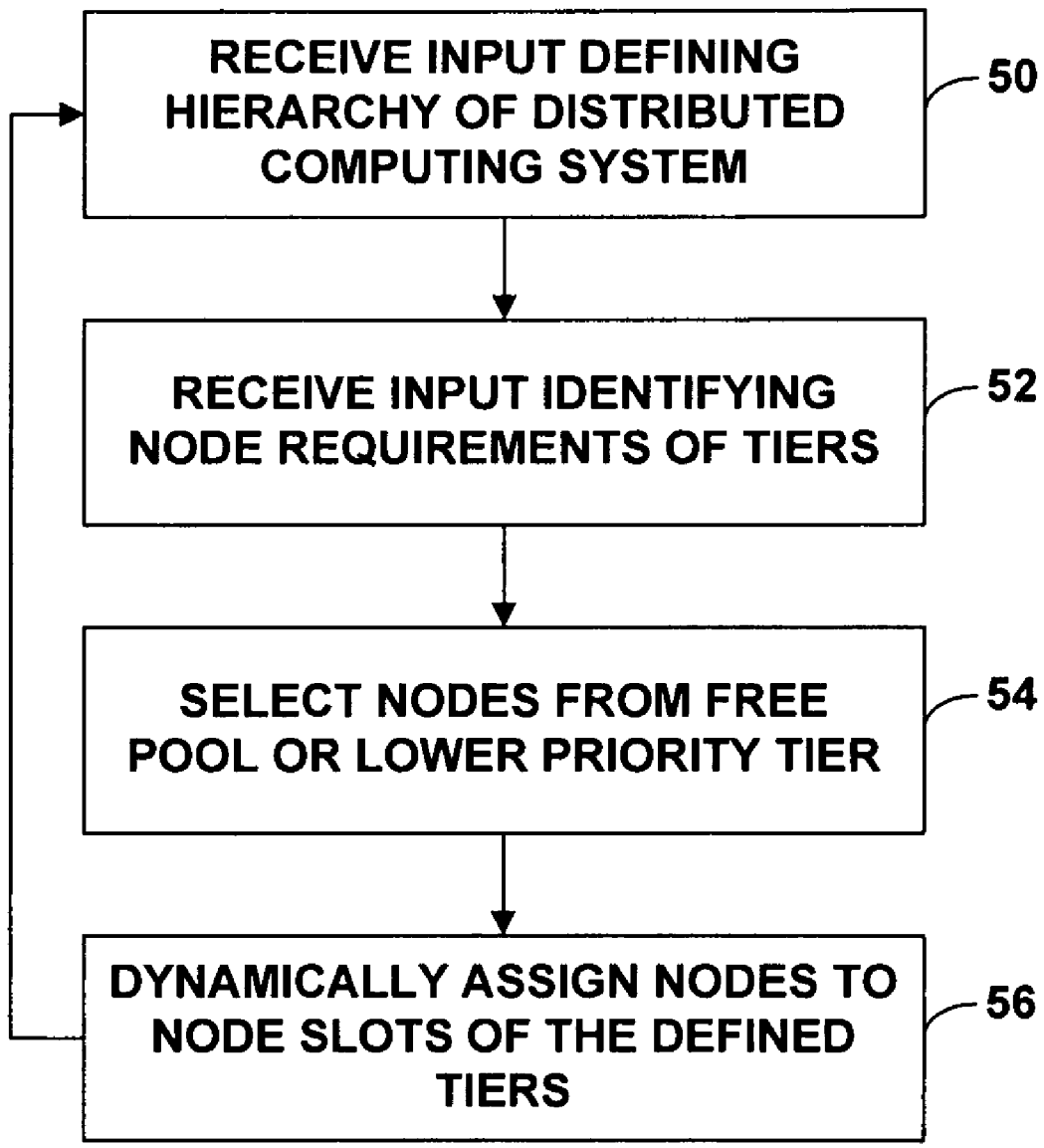
FIG. 3 is a flow diagram that provides a high-level overview of the operation of a control node when configuring the distributed computing system.

FIG. 3 is a flow diagram that provides a high-level overview of the operation of control node 12 when configuring distributed computing system 10. Initially, control node 12 receives input from a system administrator defining the hierarchical organization of distributed computing system 10 (50). In one example, control node 12 receives input that defines a model that specifies a number of hierarchically arranged nodes as described in detail in FIG. 2. Particularly, the defined architecture of distributed computing system 10 includes an overall fabric having a number of hierarchically arranged domains, tiers and node slots.

During this process, control node 12 may receive input specifying node requirements of each of the tiers of the hierarchical model (52). As described above, administrator 20 may specify a list of attributes, e.g., a central processing unit (CPU) count, a CPU speed, an amount of memory (e.g., RAM), or local disk characteristics, that the tiers require of their candidate computing nodes. In addition, control node 12 may further receive user-defined custom attributes, such as requiring the node to have I/O, such as HBA connectivity. The node requirements or attributes defined by system administrator 20 may each include a name used to identify the characteristic, a data type (e.g., integer, long, float or string), and a weight to define the importance of the requirement.

Control node 12 identifies the attributes for all candidate computing nodes within free pool 13 or a lower priority tier (54). As described above, control node 12 may have already discovered the computing nodes and inventoried the candidate computing nodes to identify hardware characteristics of all candidate computing nodes. Additionally, control node 12 may receive input from system administrator 20 identifying specialized capabilities of one or more computing nodes that are not detectable by the inventory process.

Control node 12 dynamically assigns computing nodes to the node slots of each tier based on the node requirements specified for the tiers and the identified node attributes (56). Population of the node slots of the tier may be performed on a tier-by-tier basis beginning with the tier with the highest priority, i.e., the tier with the highest weight assigned to it. As will be described in detail, in one embodiment, control node 12 may populate the node slots of the tiers with the computing nodes that have attributes that most closely match the node requirements of the particular tiers. Thus, the computing nodes may be assigned using a "best fit" algorithm.

Figure 4:
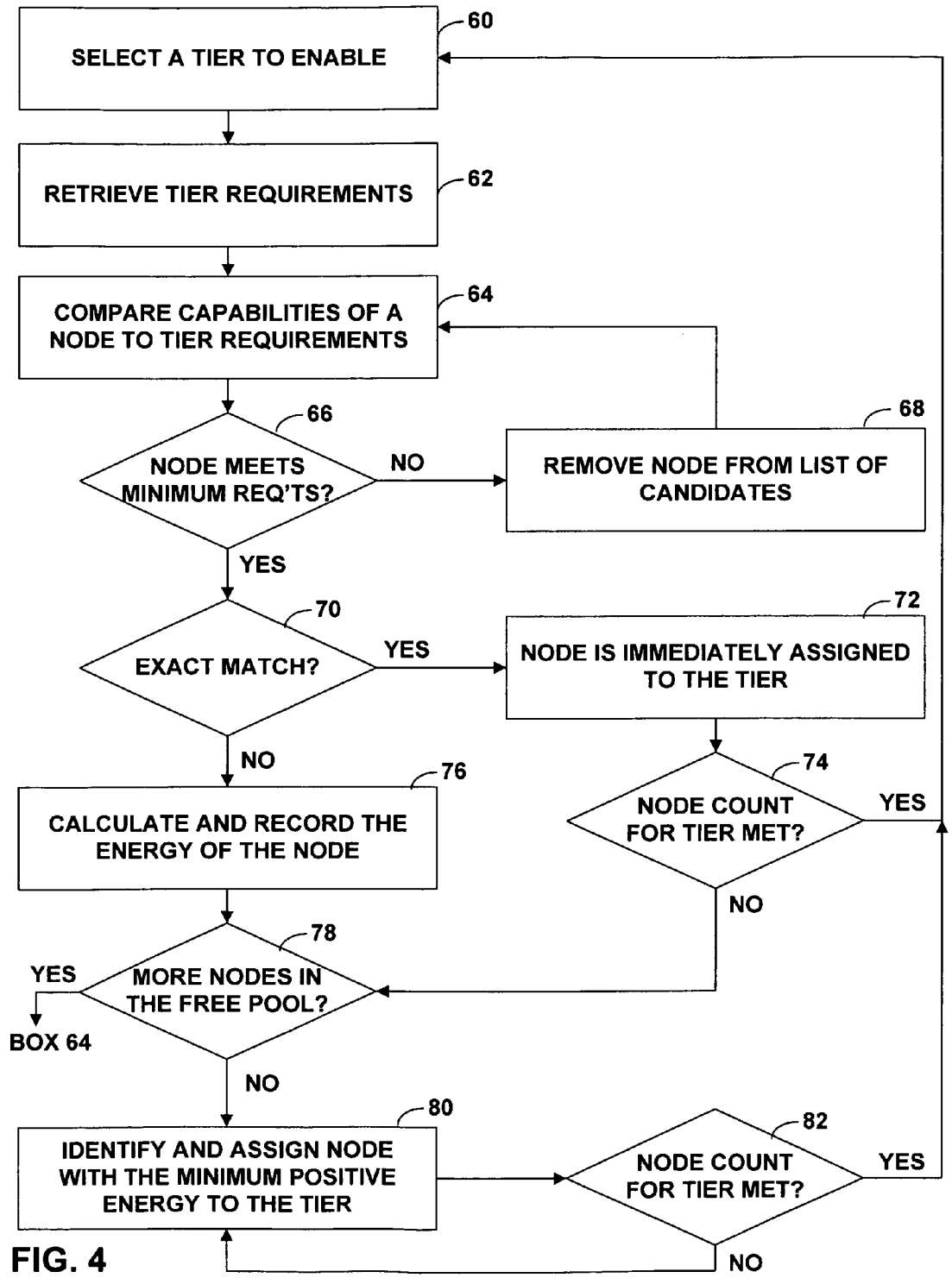
FIG. 4 is a flow diagram illustrating exemplary operation of the control node when assigning computing nodes to node slots of tiers.

FIG. 4 is a flow diagram illustrating exemplary operation of control node 12 when assigning computing nodes to node slots of tiers. Initially, control node 12 selects a tier to enable (60). As described above, control node 12 may select the tier based on a weight or priority assigned to the tier by administrator 20. Control node 12 may, for example, initially select the tier with the highest priority and successively enable the tiers based on priority.

Next, control node 12 retrieves the node requirements associated with the selected tier (62). Control node 12 may, for example, maintain a database having entries for each node slot, where the entries identify the node requirements for each of the tiers. Control node 12 retrieves the node requirements for the selected tier from the database.

In addition, control node 12 accesses the database and retrieves the computing node attributes of one of the unallocated computing nodes of free pool 13. Control node 12 compares the node requirements of the tier to the node attributes of the selected computing node (64).

Based on the comparison, control node 12 determines whether the node attributes of the computing node meets the minimum node requirements of the tier (66). If the node attributes of the selected computing node do not meet the minimum node requirements of the tier, then the computing node is removed from the list of candidate nodes for this particular tier (68). Control node 12 repeats the process by retrieving the node attributes of another of the computing nodes of the free pool and compares the node requirements of the tier to the node attributes of the computing node.

If the node attributes of the selected computing node meet the minimum node requirements of the tier (YES of 66), control node 12 determines whether the node attributes are an exact match to the node requirements of the tier (70). If the node attributes of the selected computing node and the node requirements of the tier are a perfect match (YES of 70), the computing node is immediately assigned from the free pool to a node slot of the tier and the image instance for the slot is associated with the computing node for deployment (72).

Control node 12 then determines whether the node count for the tier is met (74). Control node 12 may, for example, determine whether the tier is assigned the minimum number of nodes necessary to provide adequate processing capabilities. In another example, control node 12 may determine whether the tier is assigned the ideal number of nodes defined by system administrator 20. When the node count for the tier is met, control node 12 selects the next tier to enable, e.g., the tier with the next largest priority, and repeats the process until all defined tiers are enabled, i.e., populated with application nodes (60).

If the node attributes of the selected computing node and the node requirements of the tier are not a perfect match control node 12 calculates and records a "processing energy" of the node (76). As used herein, the term "processing energy" refers to a numerical representation of the difference between the node attributes of a selected node and the node requirements of the tier. A positive processing energy indicates the node attributes more than satisfy the node requirements of the tier. The magnitude of the processing energy represents the degree to which the node requirements exceed the tier requirements.

After computing and recording the processing energy of the nodes, control node 12 determines whether there are more candidate nodes in free pool 13 (78). If there are additional candidate nodes, control node 12 repeats the process by retrieving the computing node attributes of another one of the computing nodes of the free pool of computing nodes and comparing the node requirements of the tier to the node attributes of the computing node (64).

When all of the candidate computing nodes in the free pool have been examined, control node 12 selects the candidate computing node having the minimum positive processing energy and assigns the selected computing node to a node slot of the tier (80). Control node 12 determines whether the minimum node count for the tier is met (82). If the minimum node count for the tier has not been met, control node 12 assigns the computing node with the next lowest calculated processing energy to the tier (80). Control node 12 repeats this process until the node count is met. At this point, control node 12 selects the next tier to enable, e.g., the tier with the next largest priority (60).

In the event there are an insufficient number of computing nodes in free pool 13, or an insufficient number of computing nodes that meet the tier requirements, control node 12 notifies system administrator 20. System administrator 20 may add more nodes to free pool 13, add more capable nodes to the free pool, reduce the node requirements of the tier so more of the unallocated nodes meet the requirements, or reduce the configured minimum node counts for the tiers.

Figure 5:
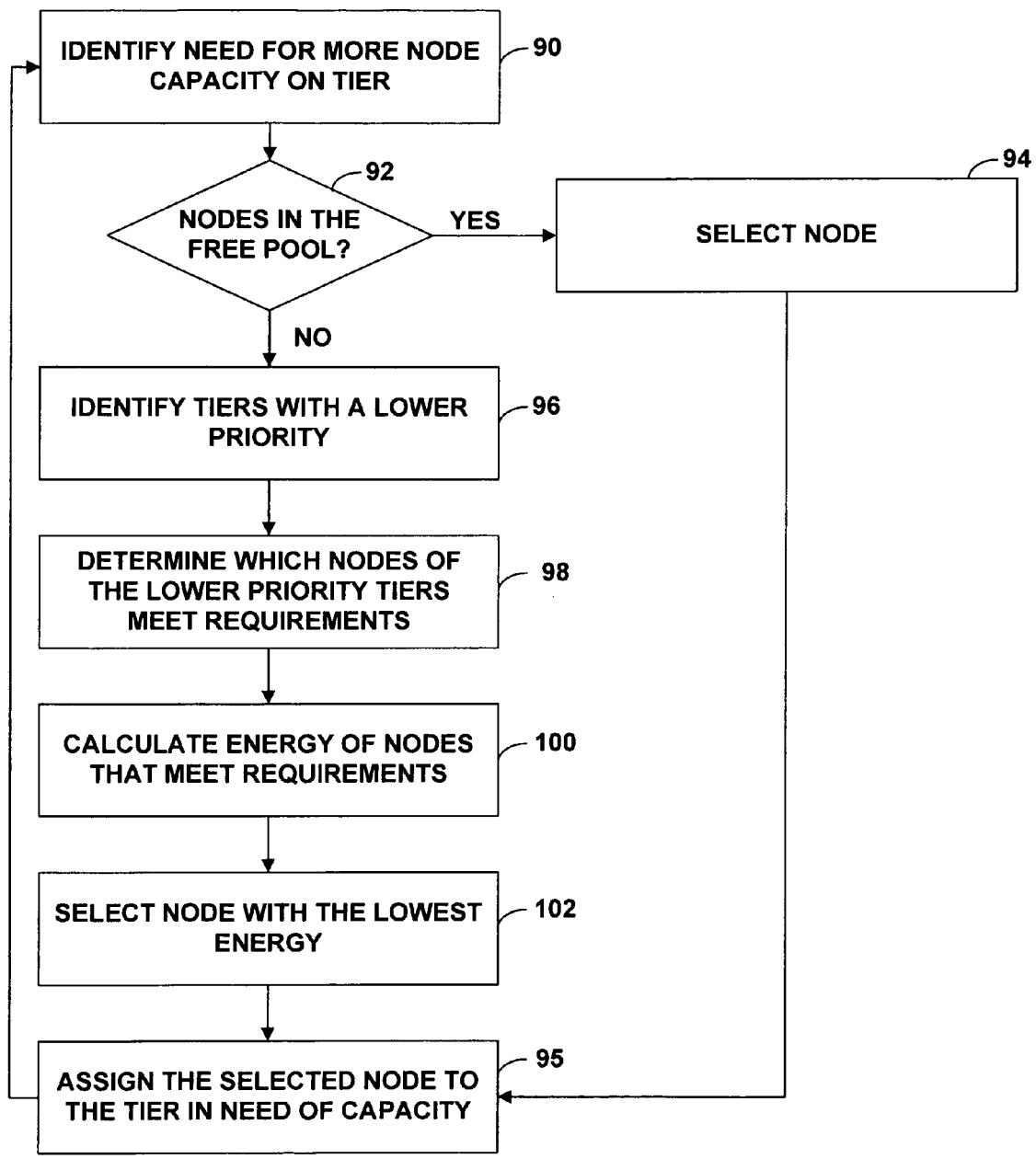
FIG. 5 is a flow diagram illustrating exemplary operation of a control node when adding an additional computing node to a tier to meet additional processing demands.

FIG. 5 is a flow diagram illustrating exemplary operation of control node 12 when adding an additional computing node to a tier to meet increased processing demands. Initially, control node 12 or system administrator 20 identifies a need for additional processing capacity on one of the tiers (90). Control node 12 may, for example, identify a high processing load on the tier or receive input from a system administrator identifying the need for additional processing capacity on the tier.

Control node 12 then determines whether there are any computing nodes in the free pool of nodes that meet the minimum node requirements of the tier (92). When there are one or more nodes that meet the minimum node requirements of the tier, control node 12 selects the node from the free pool based the node requirements of the tier, as described above, (94) and assigns the node to the tier (95). As described in detail with respect to FIG. 4, control node 12 may determine whether there are any nodes that have node attributes that are an exact match to the node requirements of the tier. If an exact match is found, the corresponding computing node is assigned to a node slot of the tier. If no exact match is found, control node 12 computes the processing energy for each node and assigns the computing node with the minimum processing energy to the tier. Control node 12 remotely powers on the assigned node and remotely boots the node with the image instance associated with the node slot. Additionally, the booted computing node inherits the network address associated with the node slot.

If there are no adequate computing nodes in the free pool, i.e., no nodes at all or no nodes that match the minimal node requirements of the tier, control node 12 identifies the tiers with a lower priority than the tier needing more processing capacity (96).

Control node 12 determines which of the nodes of the lower priority tiers meet the minimum requirements of the tier in need of processing capacity (98). Control node 12 may, for example, compare the attributes of each of the nodes assigned to node slots of the lower priority tiers to the node requirements of the tier in need of processing capacity. Lower priority tiers that have the minimum number of computing nodes may be removed from possible tiers from which to harvest an application node. If, however, all the lower priority tiers have the minimum number of computing nodes defined for the respective tier, the lowest priority tier is selected from which to harvest the one or more nodes.

Control node 12 calculates the processing energy of each of the nodes of the lower priority tiers that meet the minimum requirements (100). The energies of the nodes are calculated using the differences between the node attributes and the node requirements of the tier needing additional capacity. Control node 12 selects the computing node with the lowest processing energy that meets the minimum requirements, and assigns the selected computing node to the tier in need of processing capacity (102, 95).

Figure 6:
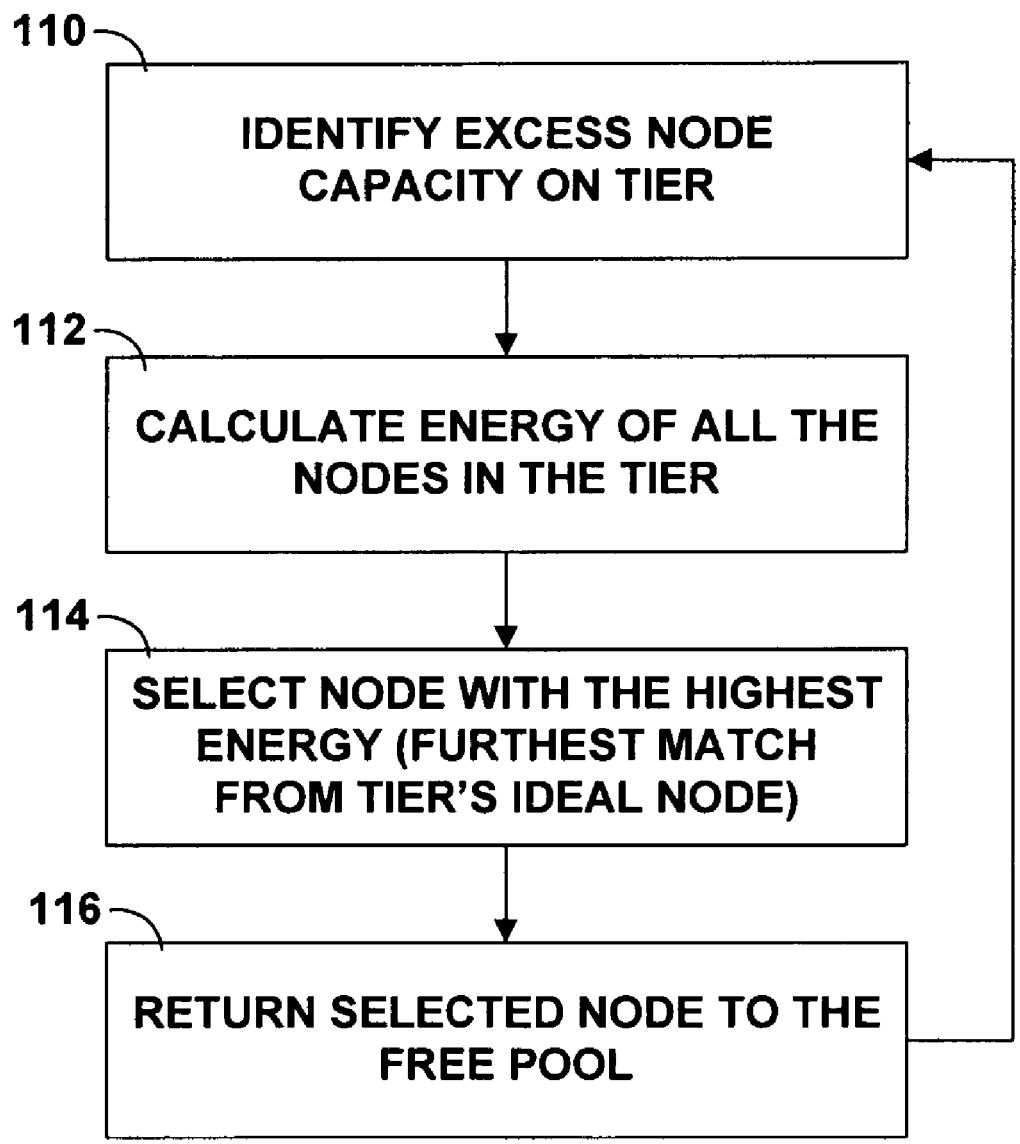
FIG. 6 is a flow diagram illustrating exemplary operation of a control node harvesting excess node capacity from one of the tiers and returning the harvested computing node to the free pool.

FIG. 6 is a flow diagram illustrating exemplary operation of control node 12 when harvesting excess node capacity from one of the tiers and returning the harvested computing node to free pool 13. Initially, control node 12 identifies a tier having excess node capacity (110). Control node 12 may, for example, periodically check the node capacity of the tiers to identify any tiers having excess node capacity. Performing a periodic check and removal of excess nodes increases the likelihood that a capable computing node will be in free pool 13 in the event one of the tiers needs additional node capacity.

When harvesting a node, control node 12 calculates the processing energy of all the nodes in the tier as described above with reference to FIG. 4 (112). Control node 12 identifies the node within the tier with the highest processing energy and returns the identified node to the free pool of nodes (114, 116). As described above, the node with the highest processing energy corresponds to the node whose node attributes are the most in excess of the node requirements of the tier.

Returning the node to the free pool may involve remotely powering off the computing node and updating the database to associate the harvested node with free pool 13. In addition, control node 12 updates the database to disassociate the returned node with the node slot to which it was assigned. At this point, the node no longer uses the network address associated with the image instance mapped to the node slot. Control node 12 may, therefore, assign a temporary network address to the node while the node is assigned to free pool 13.

Figure 7:
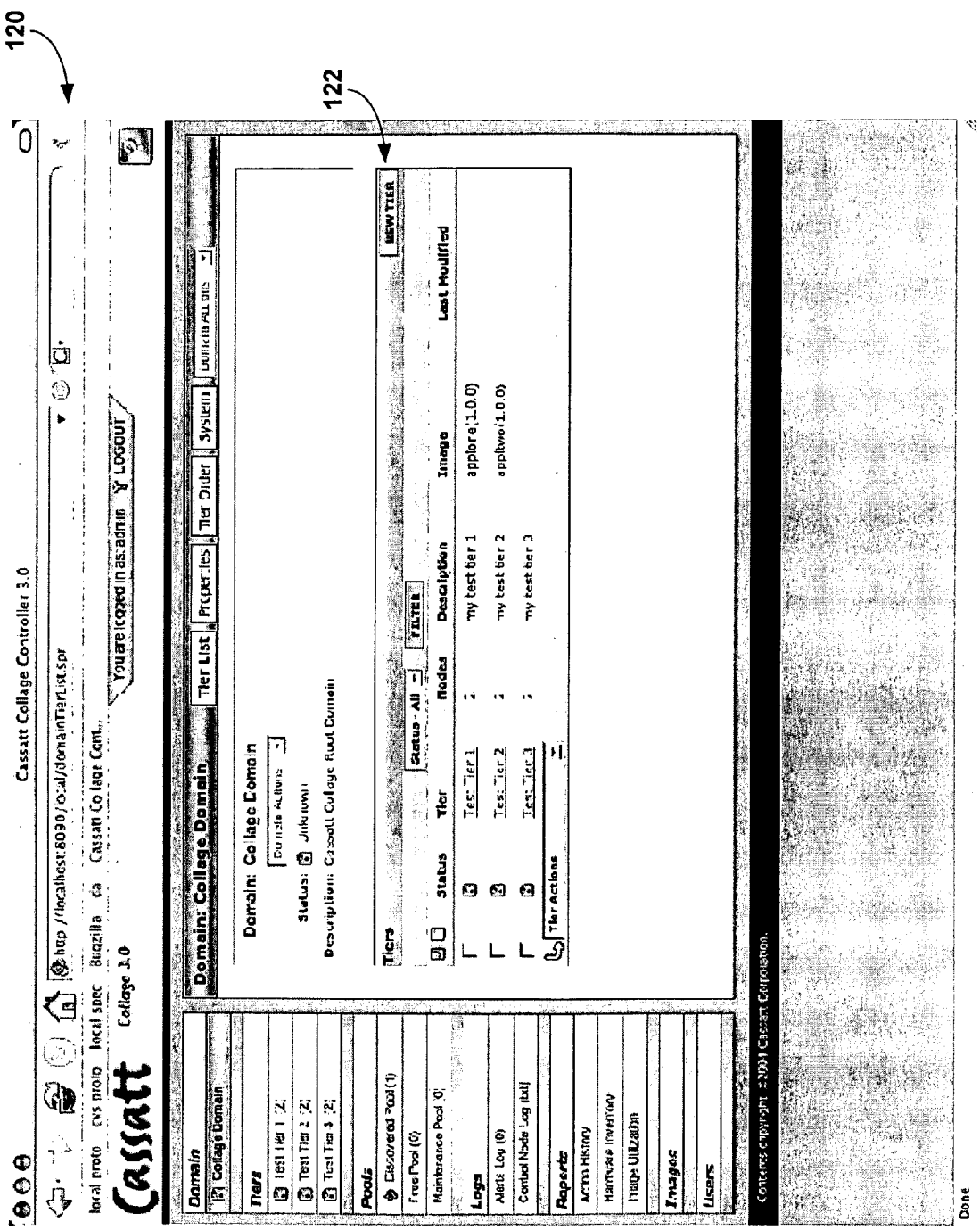
FIG. 7 is a screen illustration of an exemplary user interface for defining tiers in a particular domain.

FIG. 7 is a screen illustration of an exemplary user interface 120 presented by control node 12 with which administrator 20 interacts to define tiers for a particular domain. In the example illustrated in FIG. 7, system administrator 20 has selected the "Collage Domain." User interface 120 presents the tiers that are currently in the selected domain. In the example illustrated, the Collage Domain includes three tiers, "test tier 1," "test tier 2," and "test tier 3." As shown in FIG. 7, in this example, each of the tiers includes two nodes. In addition, user interface 120 lists the type of software image currently deployed to application nodes for each of the tiers. In the example illustrated, image "applone (1.0.0)" is deployed to the nodes of test tier 1 and image "appltwo (1.0.0)" is deployed to the nodes of test tier 2. System administrator 20 may add one or more tiers to the domain by clicking on new tier button 122.

Figure 8:
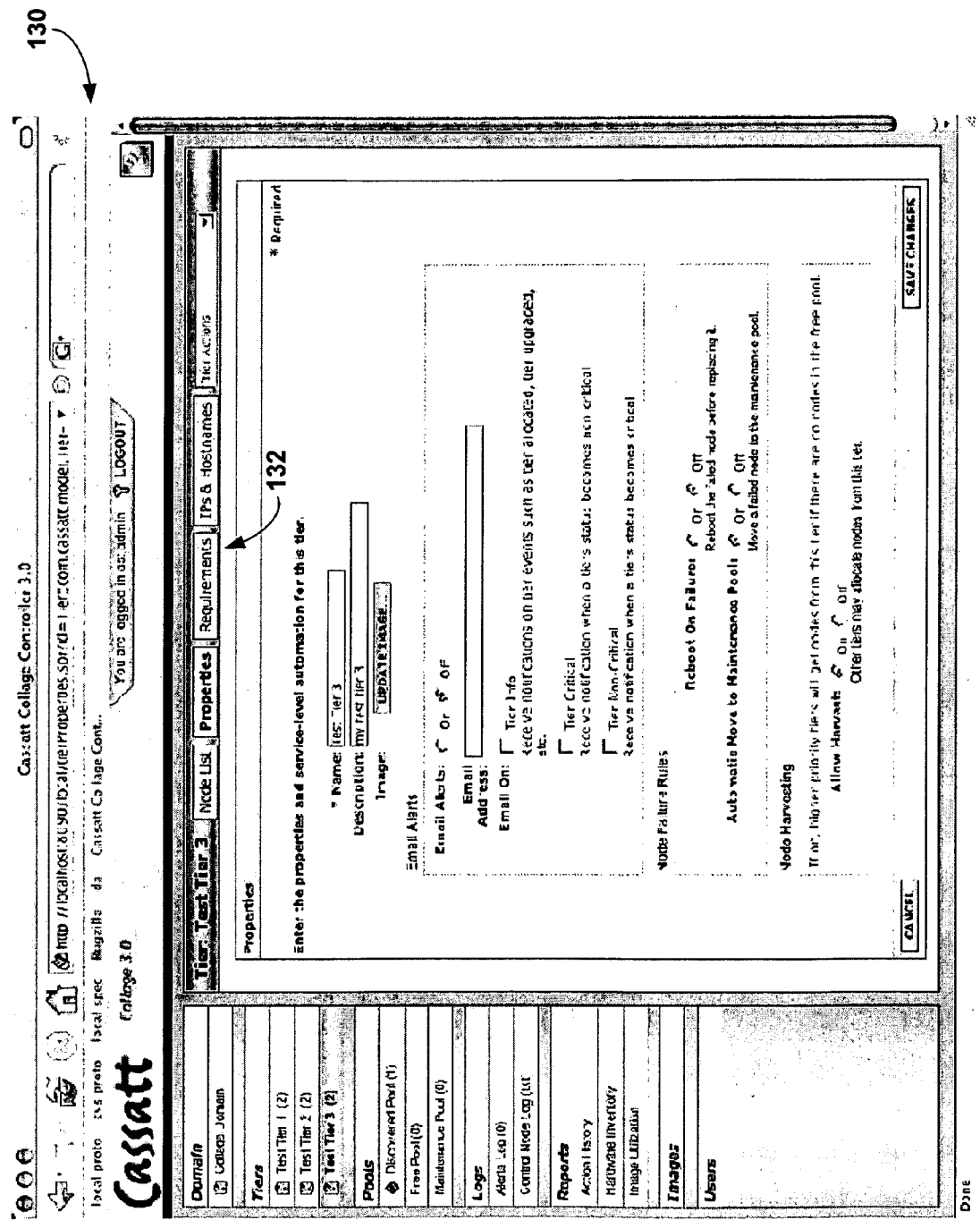
FIG. 8 is a screen illustration of an exemplary user interface for defining properties of the tiers.

FIG. 8 is a screen illustration of an exemplary user interface 130 for defining properties of the tiers. In particular, user interface 130 allows system administrator 20 to input a name for the tier, a description of the tier, and an image associated with the tier. The image associated with the tier refers to a golden image from which image instances are generated and deployed to the nodes assigned to the tier.

When configuring a tier, system administrator 20 may elect to activate email alerts. For example, system administrator 20 may activate the email alerts feature in order to receive email alerts providing system administrator 20 with critical and/or non-critical tier information, such as a notification that a tier has been upgraded, a node of the tier has failed or the like. Furthermore, system administrator 20 may input various policies, such node failure rules. For example, system administrator 20 may identify whether control node 12 should reboot a node in case of failure or whether the failed node should automatically be moved to maintenance pool 17. Similarly, system administrator 20 may identify whether nodes assigned to the tier may be harvested by other tiers.

User interface 130 may also allow system administrator 20 to input node requirements of a tier. In order to input node requirements of a tier, system administrator 20 may click on the "Requirements" tab 132, causing user interface 130 to present an input area to particular node requirements of the tier.

Figure 9:
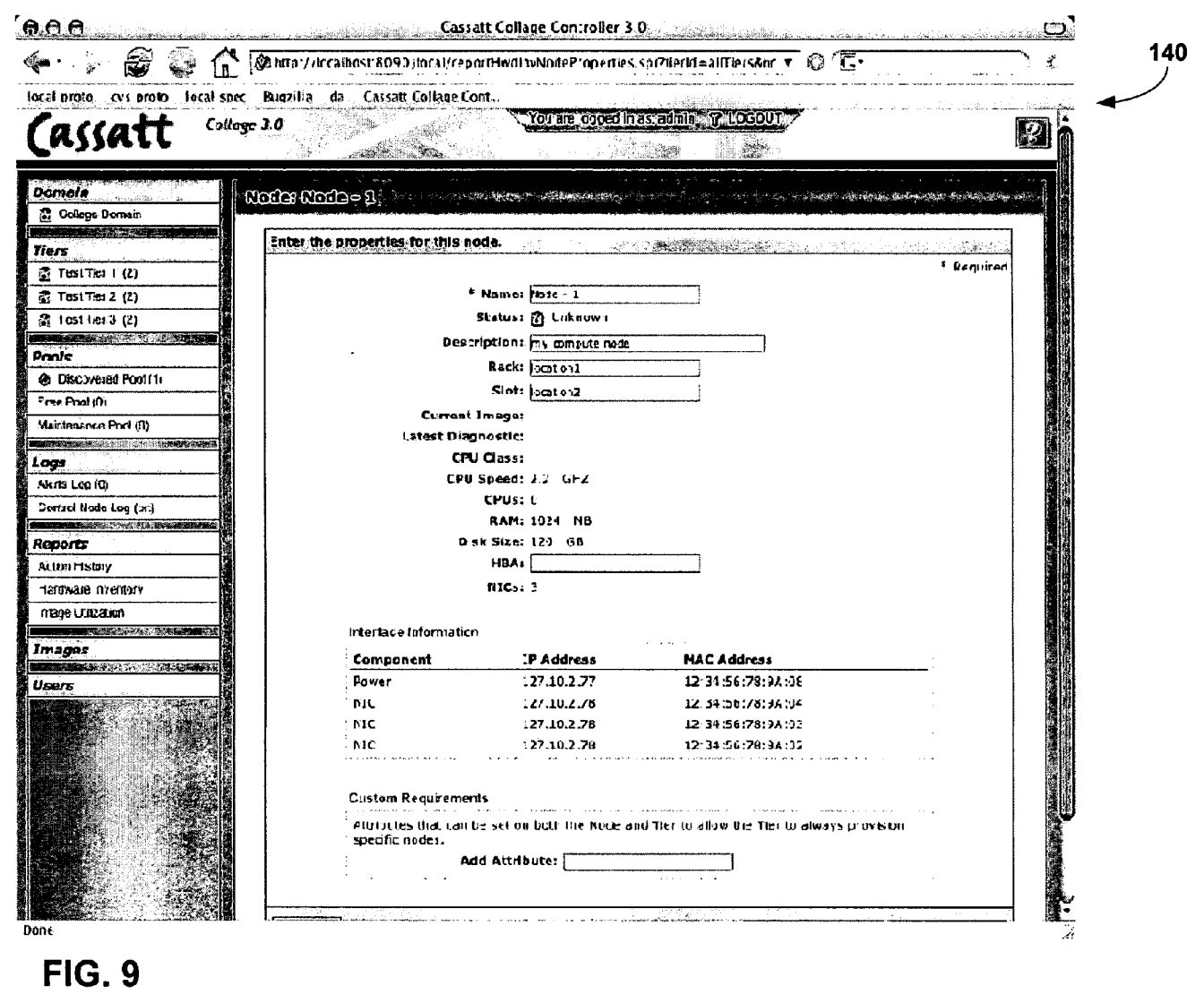

FIG. 9 is a screen illustration of an exemplary user interface 140 for viewing and identifying properties of a computing node. User interface 140 allows system administrator 20 to define a name, description, and location (including a rack and slot) of a computing node. In addition user interface 140 may specify user-defined properties of a node, such as whether the computing node has I/O HBA capabilities.

User interface 140 also displays properties that control node 12 has identified during the computing node inventory process. In this example, user interface 140 presents system administrator 20 with the a CPU node count, a CPU speed, the amount of RAM, the disk size and other characteristics that are identifiable during the automated node inventory. User interface 140 additionally presents interface information to system administrator 20. Specifically, user interface 140 provides system administrator 20 with a list of components and their associated IP and MAC addresses.

User interface 140 also allows system administrator 20 to define other custom requirements. For example, system administrator 20 may define one or more attributes and add those attributes to the list of node attributes presented to system administrator 20.

Figure 10:
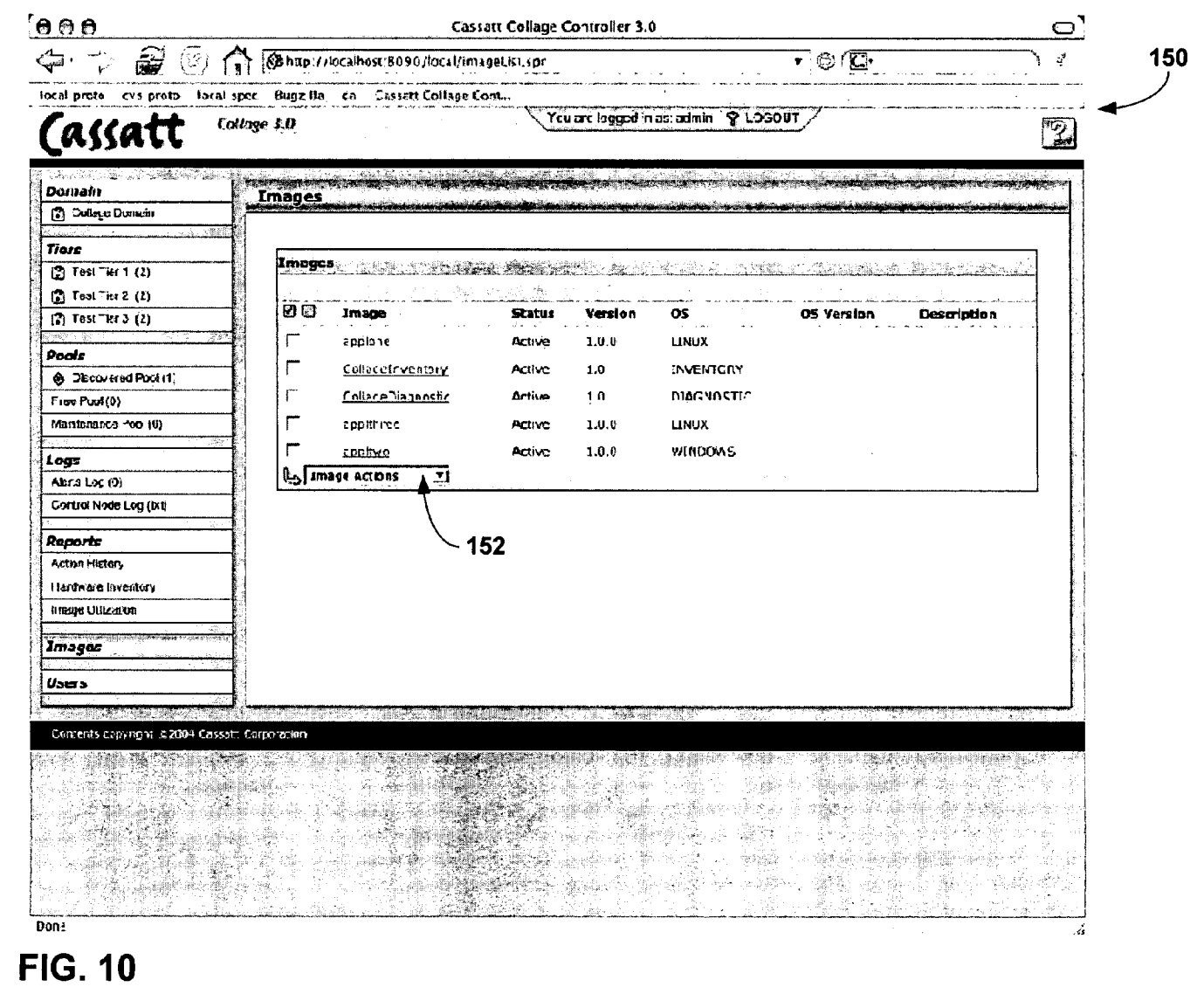

FIG. 10 is a screen illustration of an exemplary user interface 150 for viewing software images. User interface 150 presents to a system administrator or another user a list of images maintained by control node 12 within image repository 26. The image list further includes the status of each image (i.e., either active or inactive), the version of the image, the operating system on which the image should be run, the operating system version on which the image should be run and a brief description of the image.

System administrator 20 or another user may select an image by clicking on the box in front of the image identifier/name and perform one or more actions on the image. Actions that system administrator 20 may perform on an image include deleting the image, updating the image, and the like. System administrator 20 may select one of the image actions via dropdown menu 152. In some embodiments, user interface 150 may further display other details about the images such as the node to which the images are assigned (if the node status is "active"), the network address associated with the images and the like.

Figure 11:
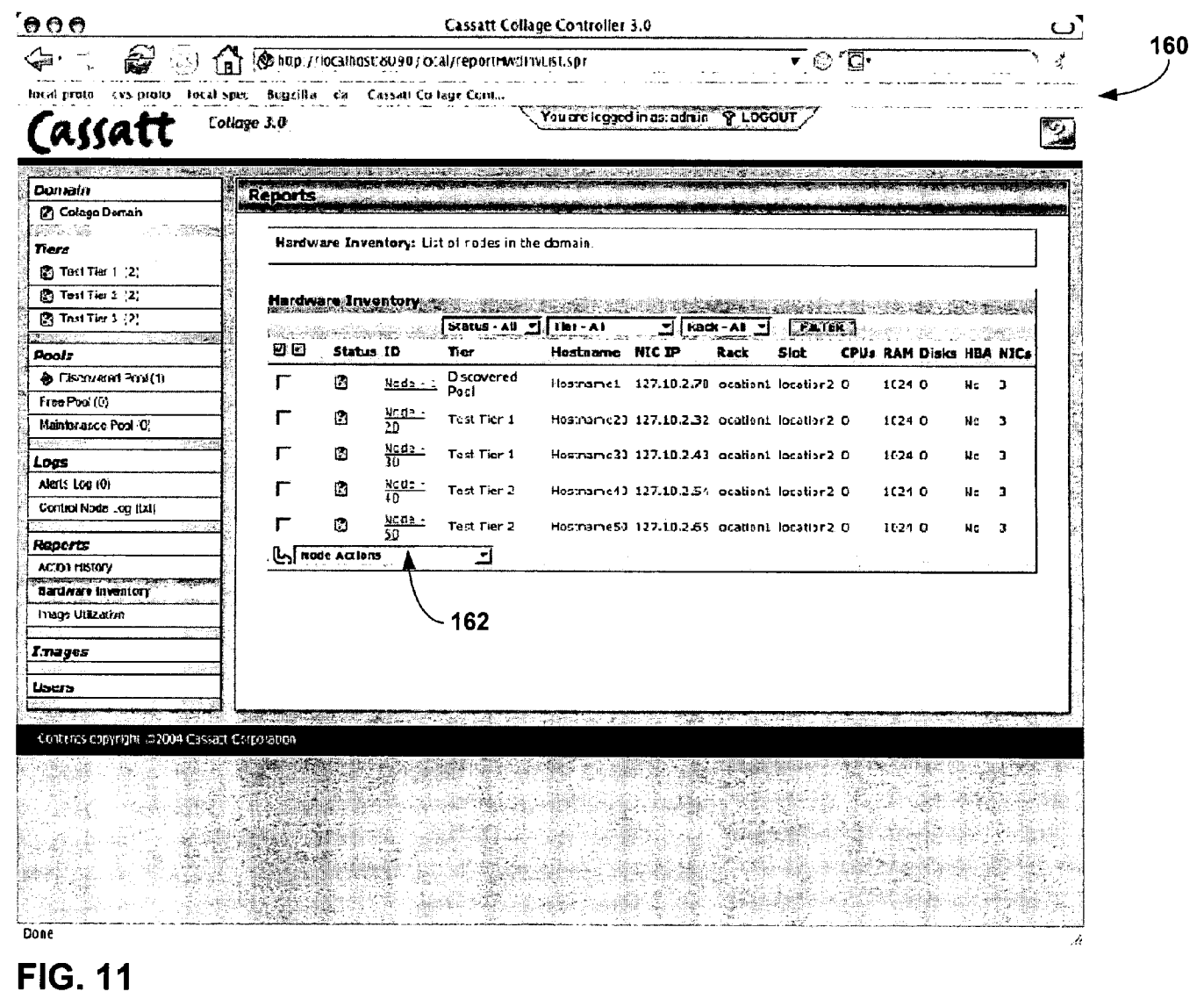

FIG. 11 is a screen illustration of an exemplary user interface 160 for viewing a hardware inventory report. User interface 160 presents to system administrator 20 or another user a list of the nodes that are currently assigned to a domain. System administrator 20 may elect to view the nodes for the entire domain, for a single tier within the domain or for a single rack within a tier.

For each node, user interface 160 presents a node ID, a status of the node, the tier to which the node belongs, a hostname associated with the node, a NIC IP address, a rack location, a slot location, the number of CPU's of the node, the amount of RAM on the node, the number of disks on the node, whether the node has I/O HBA, and the number of NICs of the node.

System administrator 20 or other user may select a node by clicking on the box in front of the node identifier/name and perform one or more actions on the node. Actions that system administrator 20 may perform on the node include deleting the node, updating the node attributes or other properties of the node, and the like. System administrator 20 may select one of the node actions via dropdown menu 162.

Figure 12:
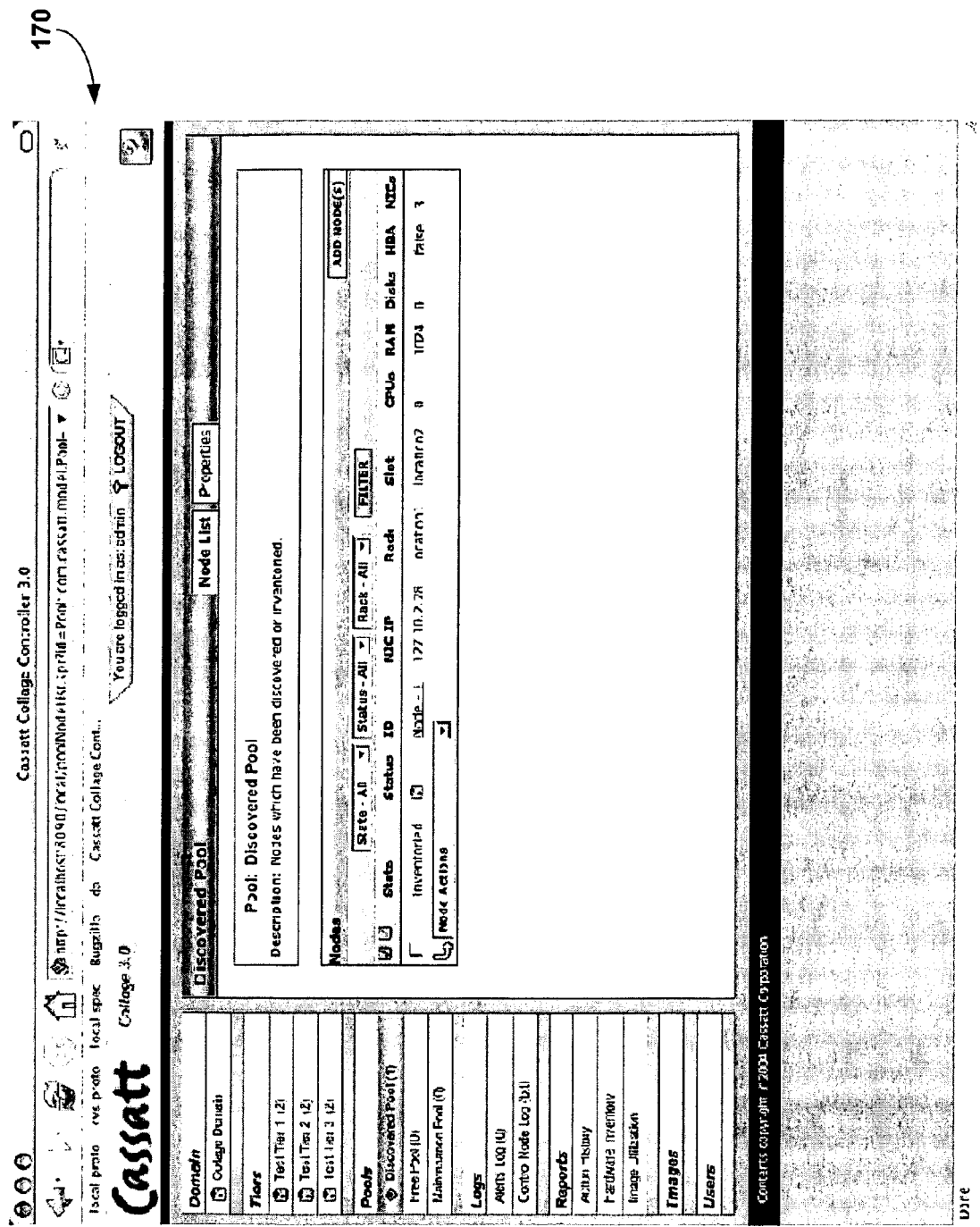
FIG. 12 is a screen illustration of an exemplary user interface for viewing discovered nodes that are located in the free pool.

FIG. 12 is a screen illustration of an exemplary user interface 170 for viewing discovered nodes that are located in discovered pool 11. For each node, user interface 170 presents a node ID, a state of the node, a NIC IP address, a rack location, a slot location, the number of CPU's of the node, the amount of RAM on the node, the number of disks on the node, whether the node has I/O HBA, and the number of NICs of the node.

Figure 13:
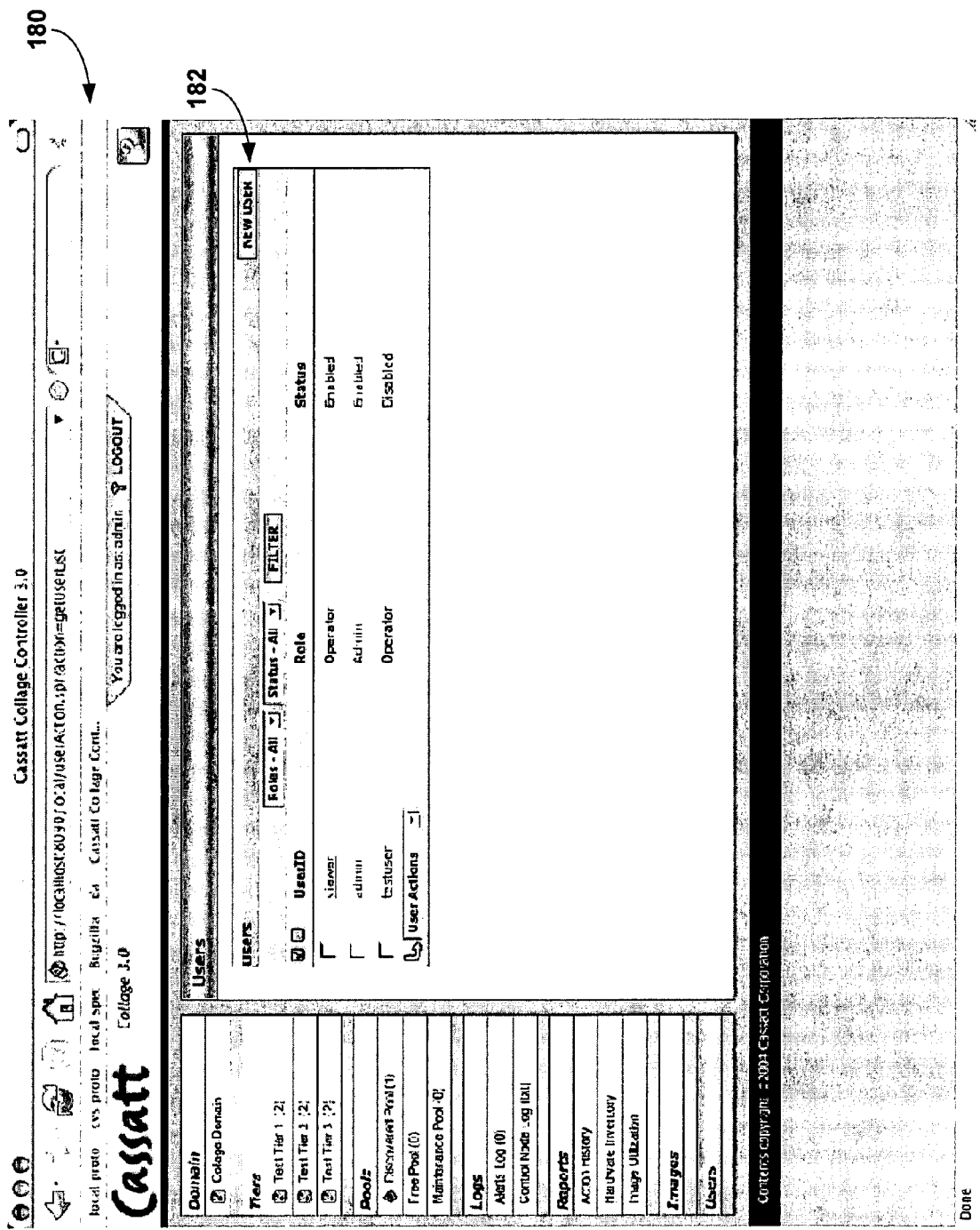
FIG. 13 is a screen illustration of an exemplary user interface for viewing users of a distributed computing system.

FIG. 13 is a screen illustration of an exemplary user interface 180 for viewing users of distributed computing system 10. User interface 180 presents a list of users as well as the role assigned to each of the users and the status of each of the users. Thus, system administrator 20 may define different roles to each of the users. For example, a user may be either an operator (i.e., general user) or an administrator. System administrator 20 may add a new user to the list of users by clicking on the "New User" button 182.

Figure 14:
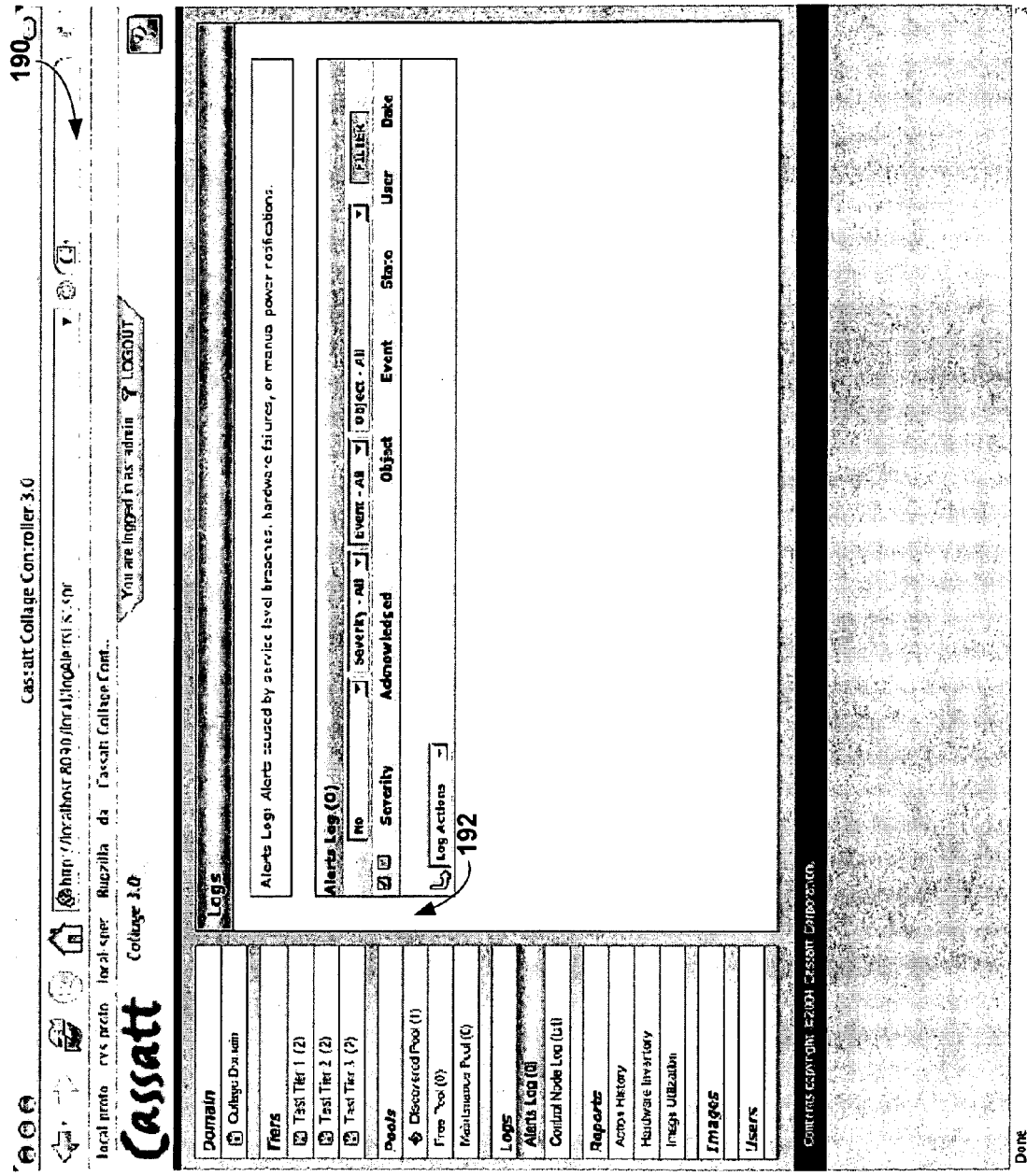
FIG. 14 is a screen illustration of an exemplary user interface for viewing alerts for the distributed computing system.

FIG. 14 is a screen illustration of an exemplary user interface 190 for viewing alerts for distributed computing system 10. For each of the alerts, user interface 190 identifies the severity of the alert, whether the alert has been acknowledged, an object associated with the alert, an event associated with the alert, a state of the alert, a user associated with the alert and a date associated with the alert.

System administrator 20 or other user may select an alert by clicking on the box in front of the logged alert and perform one or more actions on the logged alert. Actions that system administrator 20 may perform include deleting the alert, changing the status of the alert, or the like. System administrator 20 may specify the log actions via dropdown menu 192.

Figure 15:
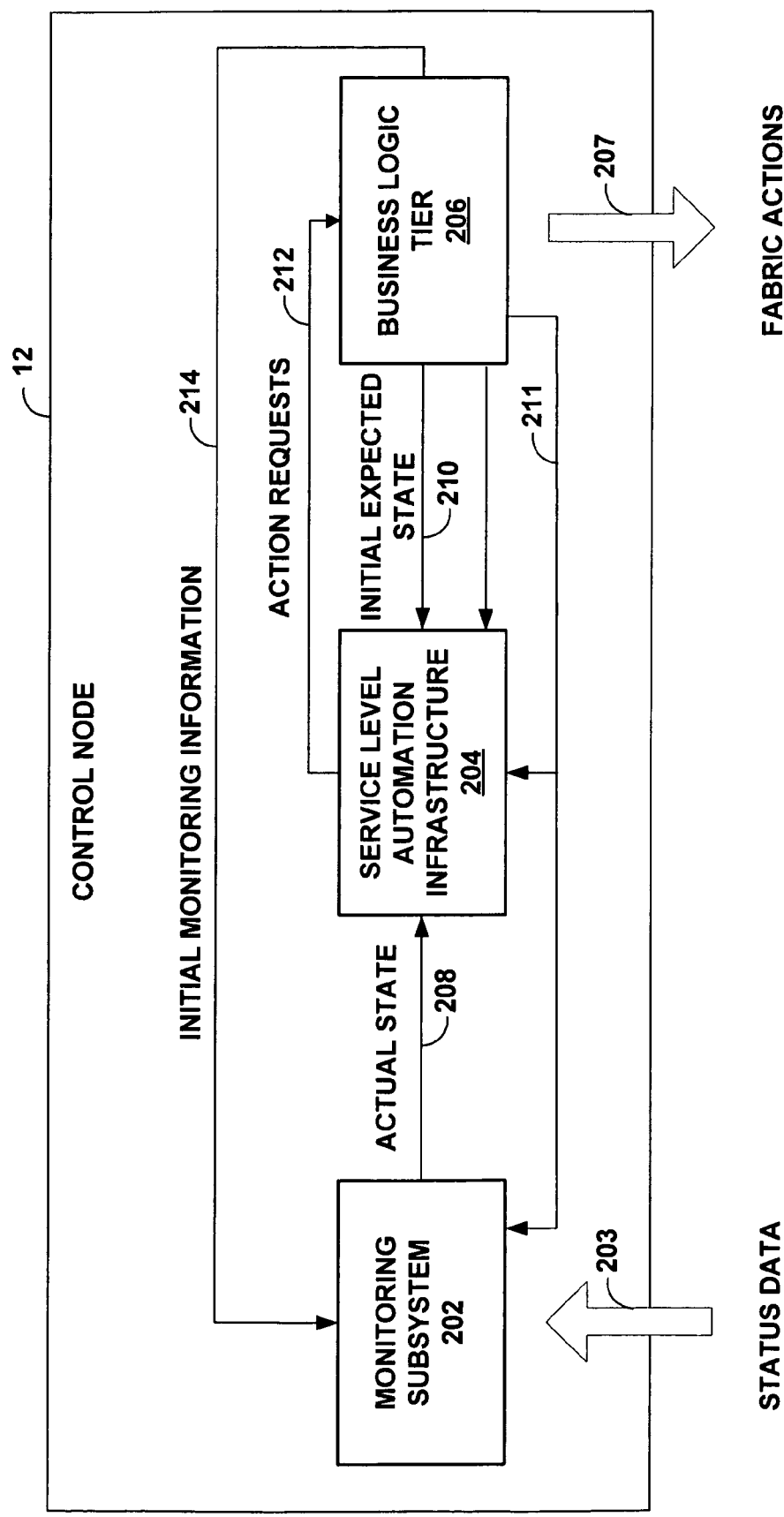
FIG. 15 is a block diagram illustrating one embodiment of control node that includes a monitoring subsystem, a service level automation infrastructure (SLAI), and a business logic tier (BLT).

FIG. 15 is a block diagram illustrating one embodiment of control node 12 in further detail. In the illustrated example, control node 12 includes a monitoring subsystem 202, a service level automation infrastructure (SLAI) 204, and a business logic tier (BLT) 206.

Monitoring subsystem 202 provides real-time monitoring of the distributed computing system 10. In particular, monitoring subsystem 202 dynamically collects status data 203 from the hardware and software operating within distributed computing system 10, and feeds the status data in the form of monitor inputs 208 to SLAI 204. Monitoring inputs 208 may be viewed as representing the actual state of the fabric defined for the organizational model implemented by distributed computing system 10. Monitoring subsystem 202 may utilize well defined interfaces, e.g., the Simple Network Management Protocol (SNMP) and the Java Management Extensions (JMX), to collect and export real-time monitoring information to SLAI 204.

SLAI 204 may be viewed as an automation subsystem that provides support for autonomic computing and acts as a central nervous system for the controlled fabric. In general, SLAI 204 receives monitoring inputs 208 from monitoring subsystem 202, analyzes the inputs and outputs appropriate action requests 212 to BLT 206. In one embodiment, SLAI 204 is a cybernetic system that controls the defined fabric via feedback loops. More specifically, administrator 20 may interact with BLT 206 to define an expected state 210 for the fabric. BLT 206 communicates expected state 210 to SLAI 204. SLAI 204 receives the monitoring inputs from monitoring subsystem 202 and applies rules to determine the most effective way of reducing the differences between the expected and actual states for the fabric.

For example, SLAI 204 may apply a rule to determine that a node within a high priority tier has failed and that the node should be replaced by harvesting a node from a lower priority tier. In this example, SLAI 204 outputs an action request 212 to invoke BLT 206 to move a node from one tier to the other.

In general, BLT 206 implements high-level business operations on fabrics, domains and tiers. SLAI 204 invokes BLT 206 to bring the actual state of the fabric into accordance with the expected state. In particular, BLT 206 outputs fabric actions 207 to perform the physical fabric changes. In addition, BLT 206 outputs an initial expected state 210 to SLAI 204 and initial monitoring information 214 to SLAI 204 and monitoring subsystem 202, respectively. In addition, BLT 206 outputs notifications 211 to SLAI 204 and monitoring subsystem 202 to indicate the state and monitoring changes to distributed computing system 10. As one example, BLT 206 may provide control operations that can be used to replace failed nodes. For example, BLT 206 may output an action request indicating that a node having address 10.10.10.10 has been removed from tier ABC and a node having address 10.10.10.11 has been added to tier XYZ. In response, monitoring subsystem 202 stops attempting to collect status data 203 from node 10.10.10.10 and starts monitoring for status data from node 10.10.10.11 . In addition, SLAI 204 updates an internal model to automatically associate monitoring inputs from node 10.10.10.11 with tier XYZ.

Figure 16:
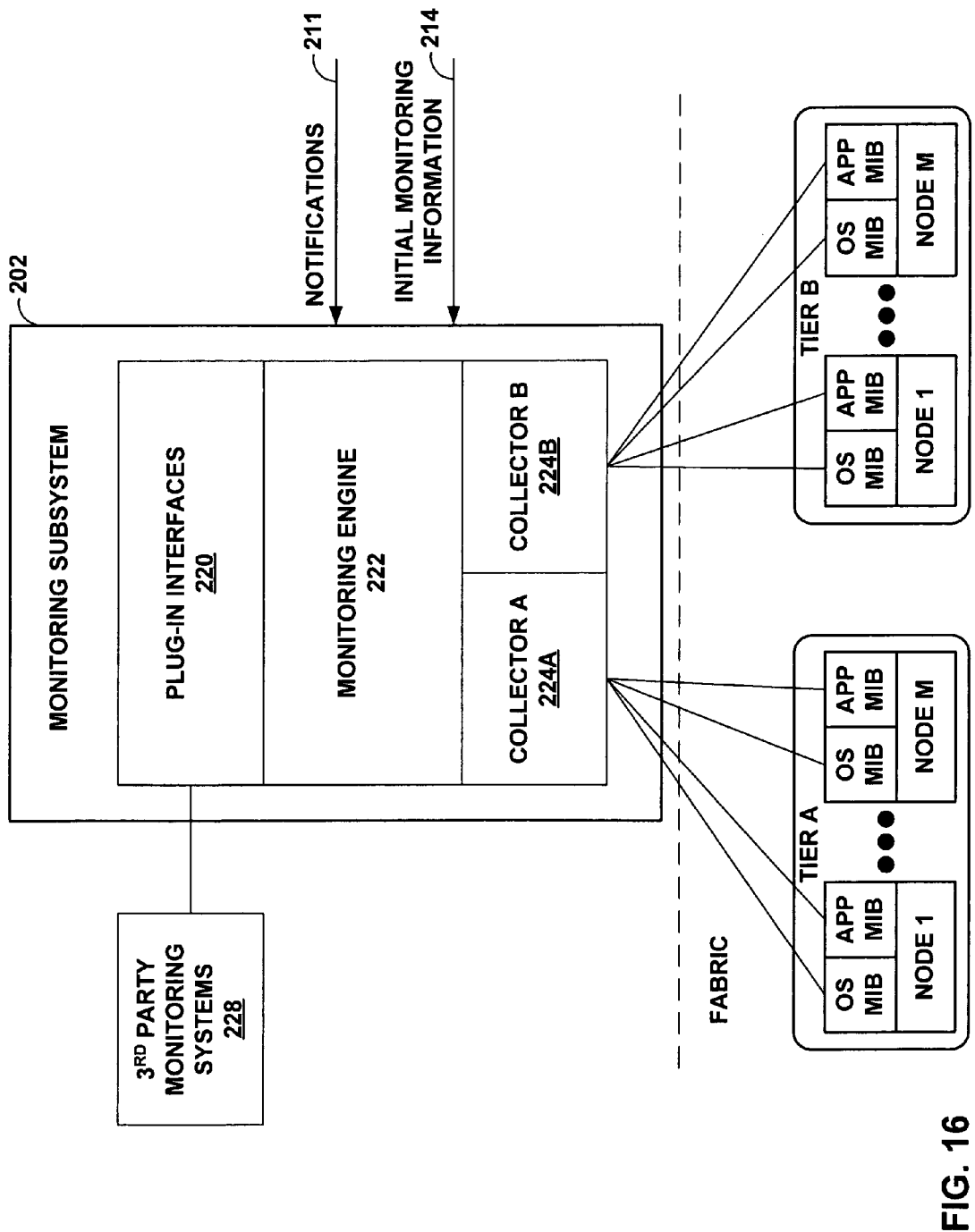
FIG. 16 is a block diagram illustrating one embodiment of the monitoring subsystem.

FIG. 16 is a block diagram illustrating one embodiment of monitoring subsystem 202. In general, monitoring subsystem 202 dynamically detects and monitors a variety of hardware and software components within the fabric. For example, monitoring subsystem 202 identifies, in a timely and efficient manner, any computing nodes that have failed, i.e., any node that does not respond to a request to a known service. More generally, monitoring subsystem 202 provides a concise, consistent and constantly updating view of the components of the fabric.

As described further below, monitoring subsystem 202 employs a modular architecture that allows new detection and monitoring collectors 224 to be "plugged-in" for existing and new protocols and for existing and new hardware and software. As illustrated in FIG. 16, monitoring subsystem 202 provides a plug-in architecture that allows different information collectors 224 to be installed. In general, collectors 224 are responsible for protocol-specific collection of monitoring information. The plug-in architecture allows for new protocols to be added by simply adhering to a collector plug-in signature. In this example, monitoring subsystem 202 includes collectors 224A and 224B for collecting information from operating systems and applications executing on nodes within tier A and tier B, respectively.

In one embodiment, collectors 224 are loaded at startup of control node 12 and are configured with information retrieved from BLT 206. Monitoring engine 222 receives collection requests from SLAI 204, sorts and prioritizes the requests, and invokes the appropriate one of collectors 224 based on the protocol specified in the collection requests. The invoked collector is responsible for collecting the required status data and returning the status data to monitoring engine 222. If the collector is unable to collect the requested status data, the collector returns an error code.

In one embodiment, collectors 224 are Java code compiled into a jar file and loaded with a class loader at run time. Each of collectors 224 has an associated configuration file written in a data description language, such as the extensible markup language (XML). In addition, a user may interact with BLT 206 to add run-time configuration to dynamically configure collectors 224 for specific computing environments. Each of collectors 224 expose an application programming interface (API) to monitoring engine 222 for communication and data exchange.

A user, such as a system administrator, specifies the protocol or protocols to be used for monitoring a software image when the image is created. In addition, the users may specify the protocols to be used for monitoring the nodes and each service executing on the nodes. Example protocols supported by the collectors 224 include Secure Shell (SSH), Simple Network Management Protocol (SNMP), Internet Control Message Protocol (ICMP) ping, Java Management Extensions (JMX) and the Hypertext Transfer Protocol (HTTP).

Some protocols require special privileges, e.g., root privileges, to perform the required data collection. In this case, the corresponding collectors 224 communicate with a separate process that executes as the root. Moreover, some protocols may require deployment and/or configuration of data providers within the fabric. Software agents may, for example, be installed and configured on nodes and configured on other hardware. If needed, custom in-fabric components may be deployed.

In this example, the modular architecture of monitoring subsystem 202 also supports one or more plug-in interfaces 220 for data collection from a wide range of third-party monitoring systems 228. Third-party monitoring systems 228 monitor portions of the fabric and may be vendor-specific.

Figure 17:
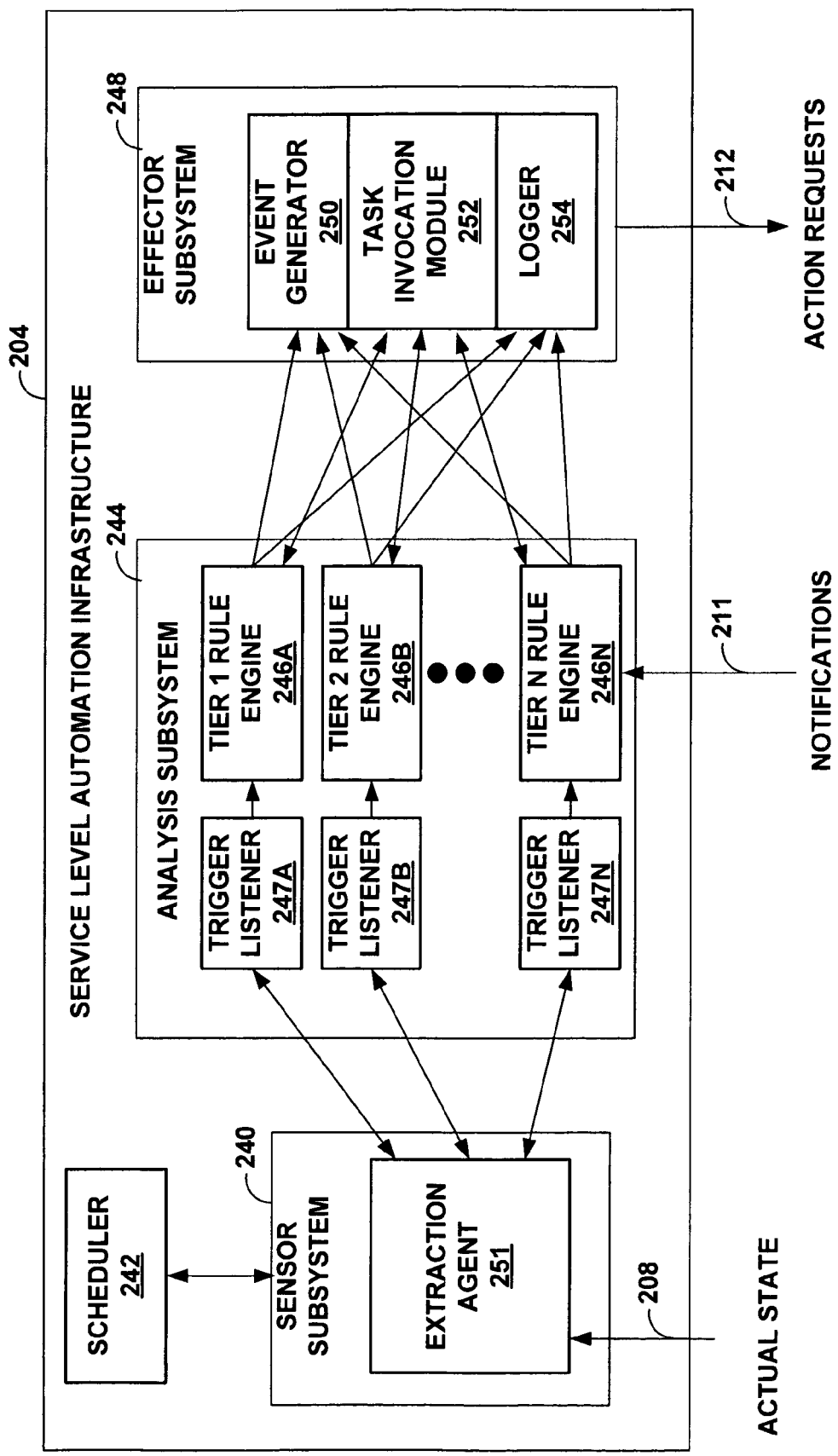
FIG. 17 is a block diagram illustrating one embodiment of the SLAI in further detail.

FIG. 17 is a block diagram illustrating one embodiment of SLAI 204 in further detail. In the illustrated embodiment, SLAI 204 is composed of three subsystems: a sensor subsystem 240, an analysis subsystem 244 and an effector subsystem 248.

In general, sensor subsystem 240 receives actual state data from monitoring subsystem 202 in the form of monitoring inputs 208 and supplies ongoing, dynamic input data to analysis subsystem 244. For example, sensor subsystem 240 is notified of physical changes to distributed computing system 10 by monitoring subsystem 202. Sensor subsystem 240 uses the state data received from monitoring subsystem 202 to maintain ongoing, calculated values that can be sent to analysis subsystem 244 in accordance with scheduler 242.

In one embodiment, sensor subsystem 240 performs time-based hierarchical data aggregation of the actual state data in accordance with the defined organization model. Sensor subsystem 240 maintains organizational data in a tree-like structure that reflects the current configuration of the hierarchical organization model. Sensor subsystem 240 uses the organizational data to perform the real-time data aggregation and map tiers and domains to specific nodes. Sensor subsystem 240 maintains the organizational data based on notifications 211 received from BLT 206 .

Sensor subsystem 240 sends inputs to analysis subsystem 244 to communicate the aggregated data on a periodic or event-driven basis. Analysis subsystem 244 may register an interest in a particular aggregated data value with sensor subsystem 240 and request updates at a specified frequency.

In response, sensor subsystem 240 interacts with monitoring subsystem 202 and scheduler 242 to generate the aggregated data required by analysis subsystem 244.

Sensor subsystem 240 performs arbitrary data aggregations via instances of plug-in classes (referred to as "triggers") that define the aggregations. Each trigger is registered under a compound name based on the entity being monitored and the type of data being gathered. For example, a trigger may be defined to aggregate and compute an average computing load for a tier every five minutes. Analysis subsystem 244 requests the aggregated data based on the registered names. In some embodiments, analysis subsystem 244 may define calculations directly and pass them to sensor subsystem 240 dynamically.

Analysis subsystem 244 is composed of a plurality of forward chaining rule engines 246A-246N. In general, rule engines 246 match patterns in a combination of configuration data and monitoring data, which is presented by extraction agent 251 in the form of events. Events contain the aggregated data values that are sent to rule engines 246 in accordance with scheduler 242.

Sensor subsystem 240 may interact with analysis subsystem 244 via trigger listeners 247 that receives updates from a trigger within sensor subsystem 240 when specified events occur. An event may be based on system state (e.g., a node transitioning to an up or down state) or may be time based.

Analysis subsystem 244 allows rule sets to be loaded in source form and compiled at load time into discrimination networks. Each rule set specifies trigger-delivered attributes. Upon loading the rule sets, analysis subsystem 244 establishes trigger listeners 247 to receive sensor notifications and update respective working memories of rule engines 246. As illustrated in FIG. 17, each of rule engines 246 may serve a different tier defined within the fabric. Alternatively, multiple rule engines 246 may serve a single tier or a single rule engine may serve multiple tiers.

Rule engines 246 process the events and invoke action requests via calls to effector subsystem 248. In addition, rule engines 246 provide a call-back interface so that effector subsystem 248 can inform a rule engine when an action has completed. Rule engines 246 prevent a particular rule from re-firing as long as any action invoked by the rule has not finished. In general, rules contain notification calls and service invocations though either may be disabled by configuration of effector subsystem 248. BLT 206 supplies initial system configuration descriptions to seed each of rule engines 246.

In general, rule engines 246 analyze the events and discover discrepancies between an expected state of the fabric and an actual state. Each of rule engines 246 may be viewed as software that performs logical reasoning using knowledge encoded in high-level condition-action rules. Each of rule engines 246 applies automated reasoning that works forward from preconditions to goals defined by system administrator 20. For example, rule engines 246 may apply modus ponens inferences rules.

Rule engines 246 output requests to effector subsystem 248 which produce actions requests 212 for BLT 206 to resolve the discrepancies. Effector subsystem 248 performs all operations on behalf of analysis subsystem 244. For example, event generator 250, task invocation module 252 and logger 254 of effector subsystem 248 perform event generation, BLT action invocation and rule logging, respectively. More specifically, task invocation module 252 invokes asynchronous operations within BLT 206. In response, BLT 206 creates a new thread of control for each task which is tracked by a unique task identifier (task id). Rules engine 246 uses the task id to determine when a task completes and, if needed, to re-fire any rules that were pended until completion of the task. These tasks may take arbitrary amounts of time, and rules engine 246 tracks the progress of individual task via change notifications 211 produced by BLT 206.

Event generator 250 creates persistent event records of the state of processing of SLAI 204 and stores the event records within a database. Clients uses these event records to track progress and determine the current state of the SLAI 204.

Logger 254 generates detailed trace information about system activities for use in rule development and debugging. The logging level can be raised or lowered as needed without changing operation of SLAI 204.

Figure 18:
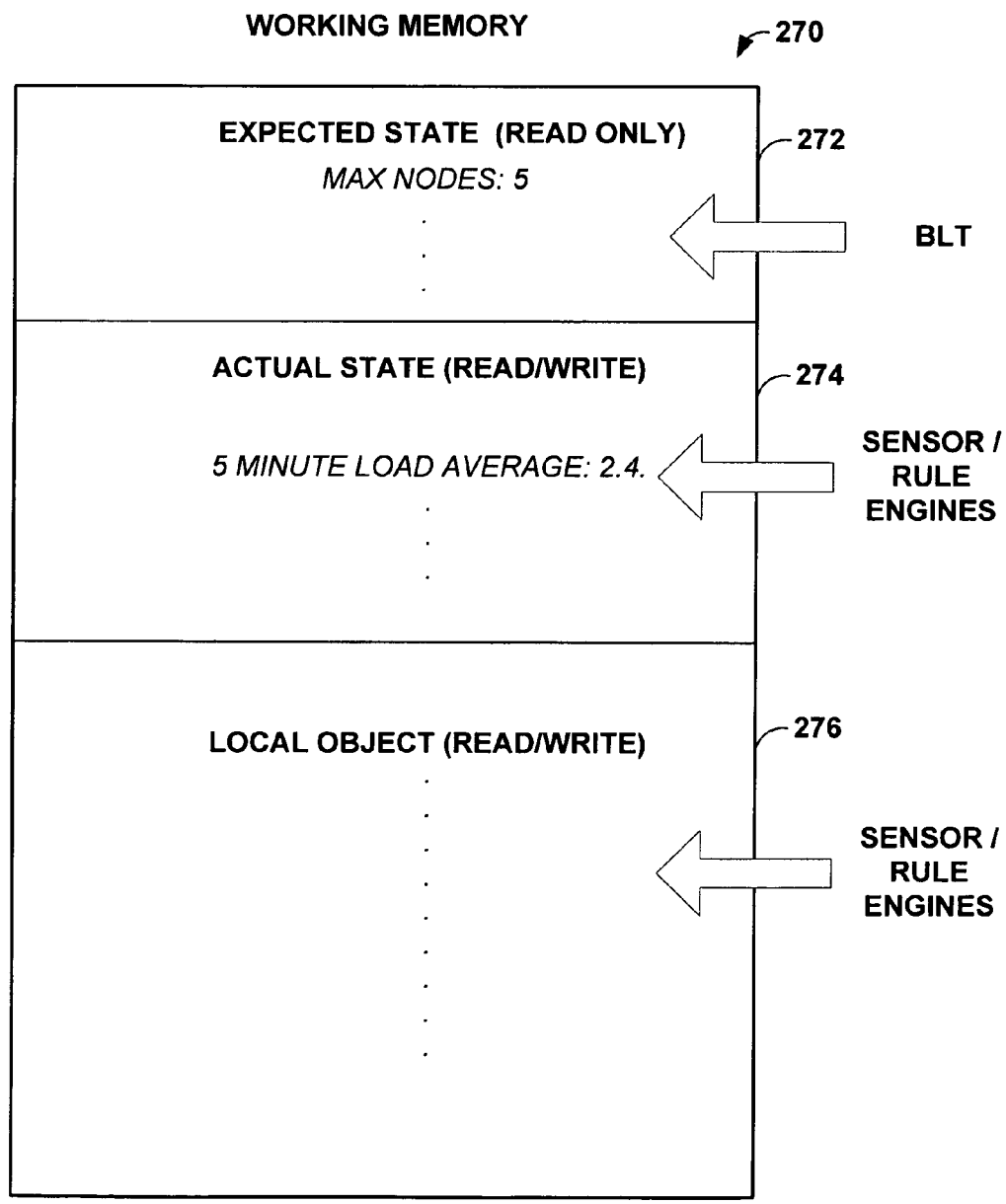
FIG. 18 is a block diagram of an example working memory associated with rule engines of the SLAI.

FIG. 18 is a block diagram of an example working memory 270 associated with rule engines 246. In this example, working memory 270 includes a read-only first data region 272 that stores the expected state received from BLT 206. Data region 272 is read-only in the sense that it cannot be modified in response to a trigger from sensor subsystem 240 or by rule engines 246 without notification from BLT 206.

In addition, working memory 270 includes a second data region 274 that is modifiable (i.e., read/write) and may be updated by monitoring subsystem 202 or used internally by rule engines 246. In general, data region 274 stores aggregated data representing the actual state of the fabric and can be updated by sensor subsystem 240 or by rule engines 246. The actual state may consist of a set of property annotations that can be attached to objects received from BLT 206 or to objects locally defined within a rule engine, such as local object 276.

Figure 19:
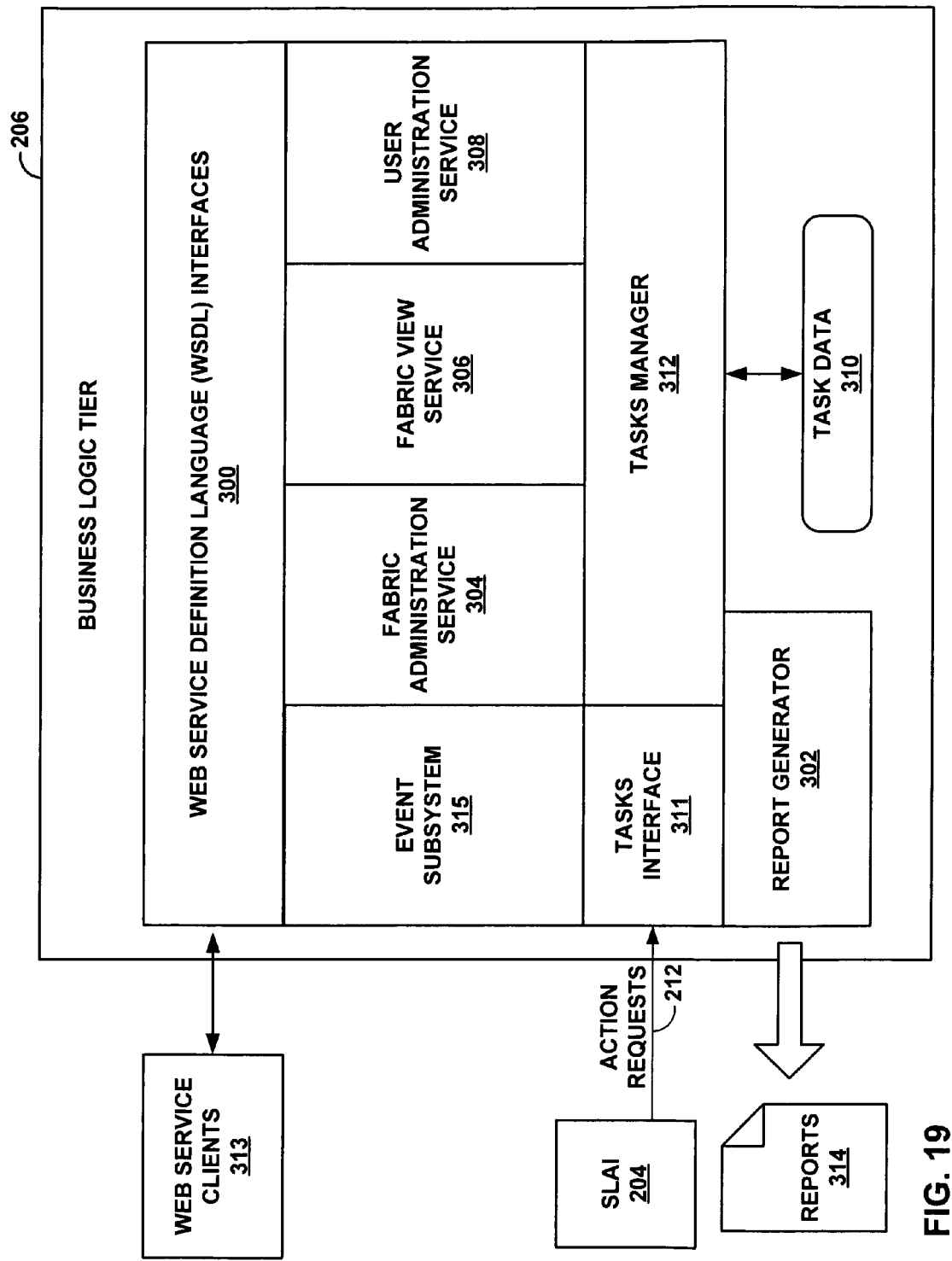
FIG. 19 is a block diagram illustrating an example embodiment for the BLT of the control node.

FIG. 19 is a block diagram illustrating an example embodiment for BLT 206. In this example, BLT 206 includes a set of one or more web service definition language (WSDL) interfaces 300, a report generator 302, a fabric administration interface service 304, a fabric view service 306, a user administration service 308, a task interface 311, a task manager 312 and an event subsystem 315.

As described, BLT 206 provides the facilities necessary to create and administer the organizational model (e.g., fabric, domains, tiers and nodes) implemented by distributed computing system 10. In general, BLT 206 abstracts access to the persisted configuration state of the fabric, and controls the interactions with interfaces to fabric hardware services. As such, BLT 206 provides fabric management capabilities, such as the ability to create a tier and replace a failed node. WSDL interfaces 300 provide web service interfaces to the functionality of BLT 206 that may be invoked by web service clients 313. Many of WSDL interfaces 300 offered by BLT 206 allow administrator 20 to define goals, such as specifying a goal of the expected state of the fabric. As further described below, rule engines 246 within SLAI 204, in turn, invoke task manager 312 to initiate one or more BLT tasks to achieve the specified goal. In general, web service clients 313 may be presentation layer applications, command line applications, or other clients.

BLT 206 abstracts all interaction with physical hardware for web service clients 313. BLT 206 is an enabling component for autonomic management behavior, but does not respond to real-time events that either prevent a goal from being achieved or produce a set of deviations between the expected state and the actual state of the system. In contrast, BLT 206 originates goals for autonomic reactions to changing configuration and state. SLAI 204 analyzes and acts upon these goals along with real-time state changes. BLT 206 sets the goals to which SLAI 204 strives to achieve, and provides functionality used by the SLAI in order to achieve the goals.

In general, BLT 206 does not dictate the steps taken in pursuit of a goal since these are likely to change based on the current state of distributed computing system 10 and changes to configurable policy. SLAI 204 makes these decisions based on the configured rule sets for the fabric and by evaluating monitoring data received from monitoring subsystem 202.

Fabric administration service 304 implements a set of methods for managing all aspects of the fabric. Example methods include methods for adding, viewing, updating and removing domains, tiers, nodes, notifications, assets, applications, software images, connectors, and monitors. Other example methods include controlling power at a node, and cloning, capturing, importing, exporting or upgrading software images. Rule engines 246 of SLAI 204 may, for example, invoke these methods by issuing action requests 212.

Task manager 312 receives action requests 212 via task interface 311. In general, task interface 311 provides an interface for receiving action requests 212 from SLAI 204 or other internal subsystem. In response, task manager 312 manages asynchronous and long running actions that are invoked by SLAI 204 to satisfy a goal or perform an action requested by a client.

Task manager 312 generates task data 310 that represents identification and status for each task. Task manager 312 returns a task identifier to the calling web service clients 313 or the internal subsystem, e.g., SLAI 204, that initiated the task. Rule engines 246 and web service clients 313 use the task identifiers to track progress and retrieve output, results, and errors associated with achieving the goal.

In one embodiment, there are no WSDL interfaces 300 for initiating specific tasks. Rather, administrator 20 interacts with BLT 206 though goal interfaces presented by WSDL interfaces 300 to define the goals for the fabric. In contrast, the term task is used to refer to internal system constructs that require no user interaction. Tasks are distinct, low-level units of work that affect the state of the fabric. SLAI 204 may combine tasks to achieve or maintain a goal state.

For example, administrator 20 can request configuration changes by either adding new goals to an object or by modifying the attributes on existing goals. Scheduled goals apply a configuration at a designated time. For example, the goals for a particular tier may specify the minimum, maximum, and target node counts for that tier. As a result, the tier can increase or decrease current node capacity by scheduling goals with different configuration values.

This may be useful, for example, in scheduling a software image upgrade. As another example, entire domains may transition online and offline per a defined grid schedule. Administrator 20 may mix and match goals on a component to achieve configurations specific to the application and environment. For example, a tier that does not support autonomic node replacement would not be configured with a harvesting goal.

In some embodiments, goals are either "in force" or "out of force." SLAI 204 only works to achieve and maintain those goals that are currently in force. SLAI 204 may applies a concept of "gravity" as the goals transition from in force to out of force. For example, SLAI 204 may transition a tier offline when an online goal is marked out of force. Some goal types may have prerequisite goals. For example, an image upgrade goal may require as a prerequisite that a tier be transitioned to offline before the image upgrade can be performed. In other embodiments, goals are always in force until modified.

SLAI 204 may automatically formulate dependencies between goals or may allow a user to specify the dependencies. For example, a user may request that a newly created tier come online. As a result of this goal, SLAI 204 may automatically direct task manager 312 to generate a task of harvesting a target number of nodes to enable the tier. Generally, all goals remain in-force by SLAI 204 until modified by BLT 206. In one embodiment, each goal remains in-force in one of three states: Satisfied, Warning, or Critical depending on how successful SLAI 204 was in achieving the goal at the time the event record was generated and stored.

In this manner, SLAI 204 controls the life cycle of a goal (i.e., the creation, scheduling, update, deletion of the goal), and provides a common implementation of these and other services such as timeout, event writing, goal conflicts, management of intra-goal dependencies, and tracking tasks to achieving the goals.

Progress toward a goal is tracked though event subsystem 315. In particular, event subsystem 315 tracks the progress of each in force goal based on the goal identifiers. Tasks executed to achieve a particular goal produce events to communicate result or errors. The events provide a convenient time-based view of all actions and behaviors.

Examples of goal types that may be defined by administrator 20 include software image management goals, node allocation goals, harvest goals, tier capacity goals, asset requirement goals, tier online/offline goals, and data gathering goals.

In one embodiment, BLT 206 presents a task interface to SLAI 204 for the creation and management of specific tasks in order to achieve the currently in force goals. In particular, rule engines 246 invoke the task interface based on evaluation of the defined rule sets in view of the expected state and actual state for the fabric. Example task interfaces include interfaces to: reserve node resources; query resources for a node slot; associate or disassociate an image with a node in a tier node slot; allocate, de-allocate, startup or shutdown a node; move a node to a tier; apply, remove or cycle power of a node; create a golden image; create or delete an image instance; and delete an activity, node or tier.

Report generator 302 provides an extensible mechanism for generating reports 314. Typical reports include image utilization reports that contain information with respect to the number of nodes running each software image, inventory reports detailing both the logical and physical aspects of the fabric, and system event reports showing all events that have occurred within the fabric. Report generator 302 gathers, localizes, formats and displays data into report form for presentation to the user. Report generator 302 may include one or more data gathering modules (not shown) that gather events in accordance with a schedule and update an events table to record the events. The data gathering modules may write the events in XML format.

Figure 20:
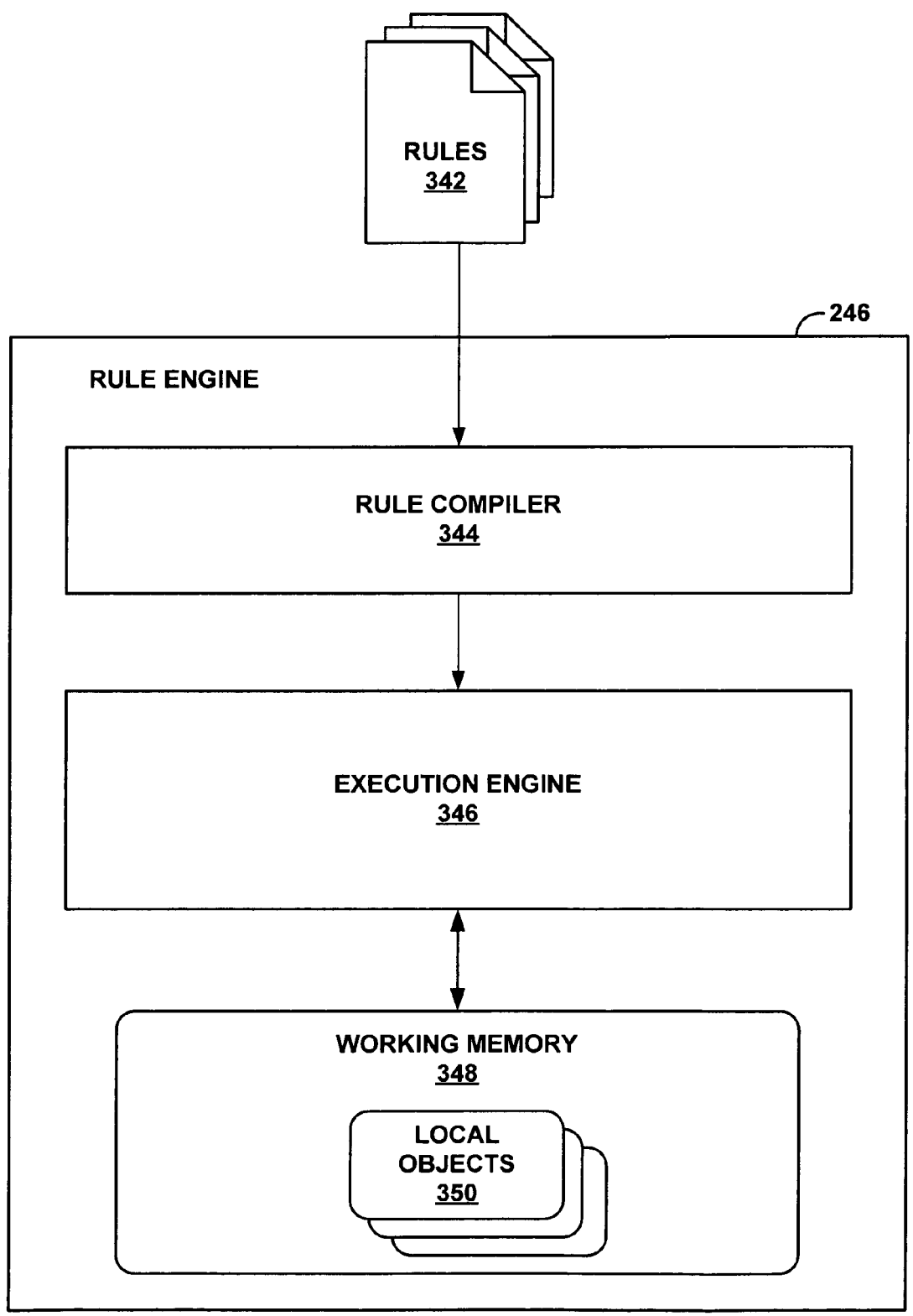
FIG. 20 is a block diagram illustrating one embodiment of a rule engine in further detail.

FIG. 20 is a block diagram illustrating one embodiment of a rule engine 246 (FIG. 17). In the illustrated embodiment, rule engine 246 includes a rule compiler 344 and an execution engine 346. Each of rules 342 represents a unit of code that conforms to a rule language and expresses a set of triggering conditions and a set of implied actions. When the conditions are met, the actions are eligible to occur. The following is one example of a configuration rule:

```
rule checkTierLoad {
    Tier t where status != "overloaded";
    LoadParameter p where app == t.app && maxload < t.load;
} > {
    modify t {
        status: "overloaded";
    };
}
```

When translated, this example rule marks a tier as overloaded if an application is implemented by the tier and the maximum specified load for the application has been exceeded. Another example rule for outputting a notification that a tier is overloaded and automatically invoking a task within BLT 206 to add a node is:

```
rule tierOverloadNotify {
    Tier t where status == "overloaded";
} > {
    notify "Tier: " + t + "is overloaded.";
    BLT.addNode(f);
}
```

Rule compiler 344 compiles each of rules 344 and translates match conditions of the rules into a discrimination network that avoids redundant tests during rule execution. Execution engine 346 handles rule administration, object insertion and retrieval, rule invocation and execution of rule actions. In general, execution engine 346 first matches a current set of rules 342 against a current state of working memory 348 and local objects 350. Execution engine 346 then collects all rules that match as well as the matched objects and selects a particular rule instantiation to fire. Next, execution engine 346 fires (executes) the instantiated rule and propagates any changes to working memory 348. Execution engine 346 repeats the process until no more matching rule instantiations can be found.

Firing of a rule typically produces a very small number of changes to working memory 348. This allows sophisticated rule engines to scale by retaining match state between cycles. Only the rules and rule instantiations affected by changes are updated, thereby avoiding the bulk of the matching process. One exemplary algorithm that may be used by execution engine 346 to handle the matching process includes the RETE algorithm that creates a decision tree that combines the patterns in all the rules and is intended to improve the speed of forward-chained rule system by limiting the effort required to re-compute a conflict set after a rule is fired. One example of a RETE algorithm is described in Forgy, C. L.: 1982, 'RETE: a fast algorithm for the many pattern/many object pattern match problem', Artificial Intelligence 19, 1737, hereby incorporated by reference. Other alternatives include the TREAT algorithms, and LEAPS algorithm, as described by Miranker, D. P.: 'TREAT: A New and Efficient Match Algorithm for AI Production Systems'. ISBN 0934613710 Daniel P. Miranker, David A. Brant, Bernie Lofaso, David Gadbois: On the Performance of Lazy Matching in Production Systems. AAAI 1990: 685692, each of which is hereby incorporated by reference.

Figure 21:
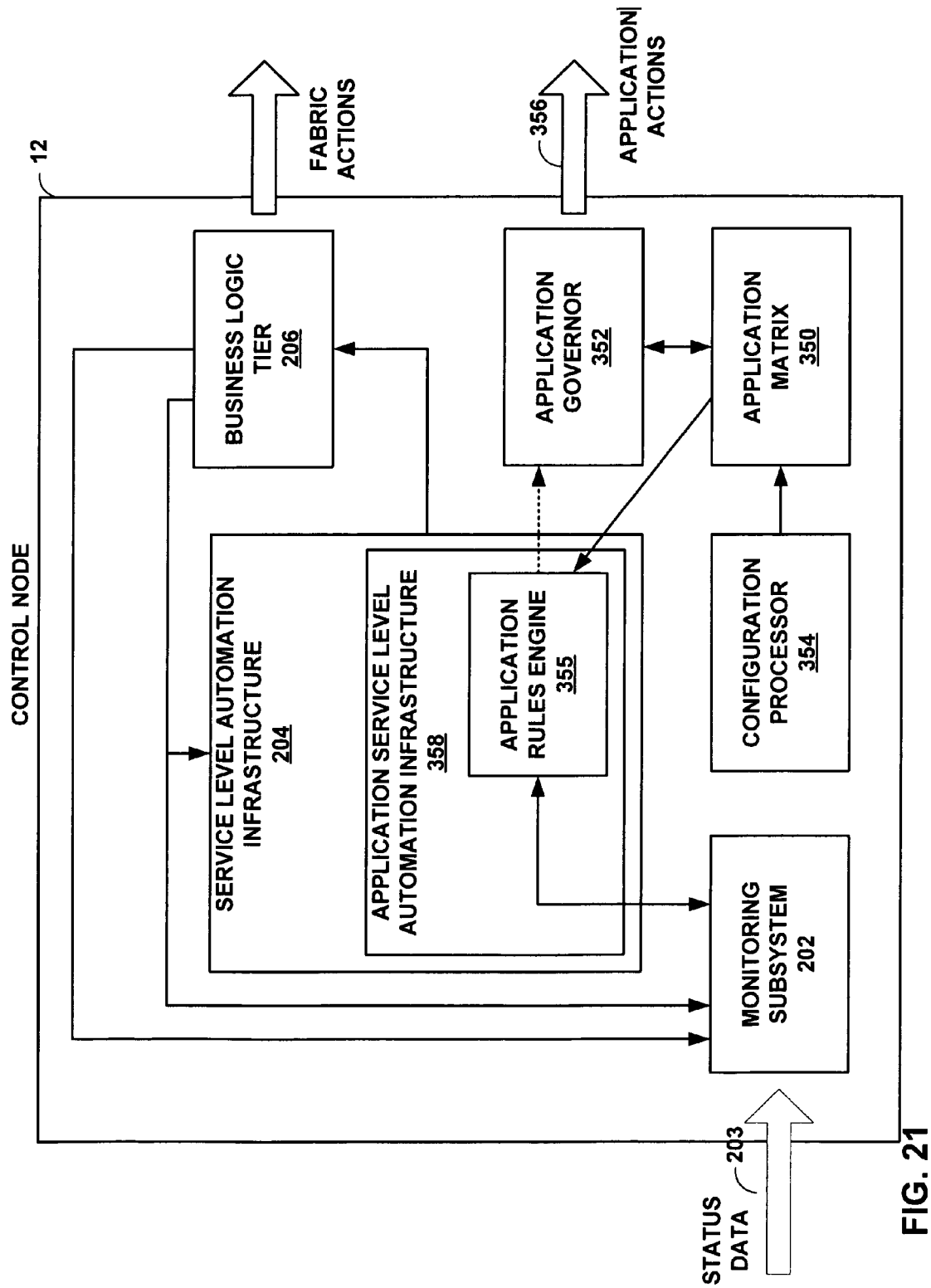
FIG. 21 is a block diagram illustrating another example embodiment of the control node.

FIG. 21 is a block diagram illustrating an alternative embodiment of control unit 12 (FIG. 15). In this embodiment, control unit 12 operates substantially as described above, but includes an application matrix 350, an application governor 352, a configuration processor 354, and an application service level automation infrastructure ("application SLAI") 358. As described below, application matrix 350, application governor 352, configuration processor 354, and application SLAI 358 provide a framework that allows control unit 12 to autonomically control the deployment, execution and monitoring of applications across application nodes 14 of distributed computing system 10.

Application matrix 350 contains all the information needed by control unit 12 to interact with one or more applications or application servers and provide autonomic control over a set of applications. Specifically, application matrix 350 provides a logical definition for deploying and controlling the set of applications to one or more tiers within distributed computing system 10. In one embodiment, application matrix 350 is an electronic document that conforms to a data description language, e.g., the extensible markup language (XML). Application SLAI 358 includes an application rules engine 355 dedicated to processing application-level rules, i.e., forward-chaining rules to provide autonomic control over the applications defined within application matrix 350. Like rules engine 246, application rules engine 355 contains a rule compiler, an execution engine, and a working memory. In order to give effect to changes in application matrix 350, application SLAI 358 automatically updates application rules engine 355 and monitoring subsystem 202. In particular, application matrix 350 sends an alert whenever application matrix 350 changes. In response to this alert, application SLAI 358 captures application-specific attributes from application matrix 350. Specifically, application SLAI 358 captures configuration attributes and rule attributes contained in application matrix 350. Application SLAI 358 transfers any new rule attributes to the working memory of application rules engine 355 to provide autonomic control over the deployment, monitoring and the execution of the applications defined within application matrix 350. In addition, application SLAI 358 updates monitoring subsystem 202 to collect information required to control the applications In this manner, administrator 20 may continue to add new application definitions and configurations to application matrix 350 after distributed control node 12 has started.

As described in further detail below, configuration processor 354 is a software module that generates an application matrix entry based on an application definition and application configuration properties of a "staged" application. A staged application is an application that has been deployed in a staging environment and customized for subsequent deployment within distributed computing system 10. After creating the application matrix entry, administrator 20 may insert the application matrix entry into application matrix 350.

Configuration processor 354 is "pluggable." That is, administrator 20 can "plug in" different implementations of configuration processor 354 as needed. For example, administrator 20 may need to "plug in" a different implementation of configuration processor 354 to handle applications that do not use an application server.

Application governor 352 is a software engine that performs application-level actions based on requests received from application rules engine 355. In this manner, BLT 206 effects fabric-level actions (e.g., deployment and monitoring of nodes and images) based on request from fabric-level rules engines 246 (FIG. 17), while application governor 352 performs application-level actions (e.g., deployment and monitoring of applications) based on requests from application rules engine 355.

Application governor 352 uses application matrix 350 as a source of parameters when carrying out the application-level operations requested by application rules engine 355. For example, application rules engine 355 may detect that a node to which the application is not deployed is ready for use by the application. As a result, application rules engine 355 directs application governor 352 to handle the details of deploying the application to the node. In turn, application governor 352 accesses application matrix 350 to retrieve application-specific parameters necessary to deploy the application. Storing application-specific parameters in application matrix 350 allows the application-specific parameters to change without having to recompile the rules within working memory of application rules engine 355.

Application governor 352 performs a similar procedure to undeploy an application. That is, application rules engine 355 may detect that a second application needs to use a node more than a first application that is currently deployed to the node. In this situation, application rules engine 355 sends an instruction to application governor 352 to undeploy the first application and deploy the second application. To carry out this instruction, application governor 352 accesses application matrix 350 to discover configuration parameters of both applications. Application governor 352 then uses the discovered configuration parameters to communicate with the applications.

Like configuration processor 354, application governor 352 is also "pluggable." That is, administrator 20 can easily install or remove implementations of application governor 352 depending on the circumstances. Because application governor 352, and configuration processor 354 represent interchangeable, plug-in modules, the other parts of control unit 12 and system 10, including application rules engine 355, can remain generic and application neutral while providing autonomic control over distributed computing system 10.

FIG. 22 provides a conceptual view of an exemplary application matrix 350. Although application matrix 350 is typically represented in an encoded, electronic document (e.g., an XML document), FIG. 22 provides a conceptual view for ease of illustration.

In this example, application matrix 350 contains seven columns and two rows. Each row represents a different application entry for deployment within distributed computing system 10. In FIG. 22, only the first entry is shown in detail.

Each of the columns represents a different category of elements that make up an application's logical definition. In this example, the columns include:

(1) an application column 360 that includes elements generally related to the deployment of the application, (2) an application nodes column 362 that contains elements related to the tier node slots to which the application may be assigned, (3) a services column 364 that contains elements related to the executable services launched when the application is deployed, (4) a node monitor values column 366 that contains elements related to attributes of the nodes that are to be monitored after the application is deployed to that node, (5) a service monitored attributes column 368 that contains elements related to attributes of the services that are to be monitored after the application is deployed, (6) a service levels column 370 that contains elements related to attributes for use when constructing rules to monitor execution of the services, and (7) a deployment constraints column 372 that contains elements related to attributes for use when constructing rules to control deployment of the application. Different types of applications may have different elements in each column, and different numbers of columns.

In the example of FIG. 22, application matrix 350 contains two applications 360 "DataDomain" 374 and "PortalDomain" 376. DataDomain application 374 has eleven attributes that define how control node 12 accesses and launches the application. For instance, the "adminIP" and "adminPort" attributes instruct governor 352 as to which the server and port hosts the administrative part of the logically defined application. Other attributes like "maxNodes" and "minNodes" instruct application rules engine 355 to run the application no less than minNodes and no more than maxNodes. Applications other than application 374 may have different numbers or types of attributes. In XML format, the attributes of application 374 may appear as follows:

```
<WebServerDomain
    name="DataDomain"
    adminIP="172.31.64.201"
    adminPort="1100"
    adminTier="Web Admin"
    clusterName="PathCluster"
    expectedStartupDelay="120"
    loadDelay="120"
    maxNodes="2"
    minNodes="1"
    nodeManagerPort="5811"
    nodeTier="Web App">
```

In addition to these attributes, application 374 contains a series of elements (columns 362-372). In general, application nodes 362 contain a list of all of the available tier-node slots to which control node 12 may deploy application 374. In this example, two tier-node slots are specified. In XML, managed servers 362 appears as:

```
<ManagedServers IP="172.31.64.201" name="managedServer_0"
    state="STOPPED" />
<ManagedServers IP="172.31.64.201" name="managedServer_1"
    state="STOPPED" />
```

Each services 364 element identifies a service that control node 12 launches when deploying application 374 on a given application node. A service element comprises a service name and a path to a file containing the executable service. Application governor 352 uses the path to locate and launch the service. For example, the following XML code indicates that governor 352 must access the file at "/lib/worklistApp/worklistApp.ear".

```
<services name="Worklist User Interface"
    path="/lib/worklistApp/worklistApp.ear" />
```

Node Monitored Values 366 elements represent characteristics for use in constructing rules for monitoring nodes to which the applications are deployed. Similarly, Service Monitored Values 368 elements represent characteristics for use in constructing rules for monitoring services that are launched once the application is deployed. In this example, a "nodeMonitoredValues" element defines characteristics of a particular node that are to be monitored. For instance, the amount of free memory in a node is one example of a characteristic listed as a "nodeMonitoredValues" element. On the other hand, a "serviceMonitoredValues" element is specific attribute of a service that is to be monitored. For example, the number of pending operating system-level requests for the service, the number of idle threads, etc., could be service monitored values. In a XML rendition of application matrix 350, node monitored values and service monitored values could appear as follows:

```
<nodeMonitoredValues name="Load5Average" />
<nodeMonitoredValues name="PercentMemoryFree" />
<serviceMonitoredValues name="PendingRequests" />
<serviceMonitoredValues name="ExecuteThreadIdleCount" />
<serviceMonitoredValues name="ExecuteThreadTotalCount" />
```

Deployment constraint elements 372 specify characteristics of a node under which application rules engine 355 should (or should not) deploy a service to the node. In this example, a deployment constraint element has five attributes: "attribute", "expression", "frequency", "maxThreshold", "minThreshold", and "period." The "attribute" attribute names the deployment constraint. The "expression" attribute specifies an arithmetic expression manipulating a monitored value. For example, the expression could be "PercentMemoryFree*100", meaning monitor the value of the "PercentMemoryFree" node monitored value multiplied by 100. The "expression" attribute may specify one or more node monitored values. The "frequency" attribute informs application rules engine 355 how frequently to check the monitored value. The "maxThreshold" attribute tells application rules engine 355 to invoke a rule when the value of the expression exceeds the value specified by the "maxThreshold" attribute. Similarly, the "minThreshold" attribute tells application rules engine 355 to invoke the rule when the value of the expression drops below the value specified by the "minThreshold" attribute. Finally, the "period" attribute informs application rules engine 355 of the period over which to collect monitored value. For example, a deployment constraint element may specify that application rules engine 355 should monitor the PercentMemoryFree attribute of a node every 15 seconds for 60 seconds. If the value of PercentMemoryFree*100 should drop below 1.0 (i.e. 1% of memory free) for 60 seconds, then application rules engine 355 should not deploy the application to that node. In XML, this rule would be represented as:

```
<deploymentConstraints attribute="FreeMemory"
expression="PercentMemoryFree*100" frequency="15"
maxThreshold="-1.0" minThreshold="1.0" period="60" />
```

Service level elements 370 have the same five attributes as deployment constraints elements: "attribute", "expression", "frequency", "maxThreshold", "minThreshold", and "period". However, the "expression" attribute deals with service monitored attributes rather than node monitored attributes. For example, a service level element may specify that application rules engine 355 check the "pendingRequest" service-monitored attribute every fifteen seconds for thirty seconds. Then, if there are more than twenty pending requests for more than thirty seconds, application rules engine 355 should take the action of starting a new application. On the other hand, if there are fewer than 5 pending requests for thirty seconds, application rules engine 355 enables the action to remove the application to free up space on a node. Such a service level element could be represented as:

```
<serviceLevels attribute="PendingRequests"
expression="PendingRequests" frequency="15"
maxThreshold="20.0"minThreshold="5.0" period="30" />
```

Put together, an XML representation of an application matrix logically defining a single application for deployment within autonomically controlled distributed computing system 10 may appear as follows:

```
<?xml version="1.0" encoding="UTF-8" standalone="yes" ?>
<appMatrixRegister>
<WebServerDomain adminIP="172.31.64.201" adminPort="1100" adminTier="Web
Admin" clusterName="PathCluster" expectedStartupDelay="120"
loadDelay="120" maxNodes="2" minNodes="1" name="DataDomain"
nodeManagerPort="5811" nodeTier="Web App">
    <ManagedServers IP="172.31.64.201" name="managedServer_0"
    state="STOPPED" />
    <ManagedServers IP="172.31.64.201" name="managedServer_1"
    state="STOPPED" />
    <applications name="AI Design-time" path="/lib/ai-designtime.ear" />
    <applications name="System EJBs" path="/lib/ejbs.ear" />
    <applications name="Worklist Worker User Interface"
    path="/lib/worklist/worklist.ear" />
    <applications name="DBMS_ADK" path="/lib/DBMS_ADK.ear" />
    <applications name="UserApp" path="/user_projects/domains/userApp.ear"
    />
    <nodeMonitoredValues name="Load5Average" />
    <nodeMonitoredValues name="PercentMemoryFree" />
    <serviceMonitoredValues name="PendingRequests" />
    <serviceMonitoredValues name="ExecuteThreadIdleCount" />
    <serviceMonitoredValues name="ExecuteThreadTotalCount" />
    <deploymentConstraints attribute="LoadAverage"
    expression="Load5Average" frequency="15" maxThreshold="4.0"
    minThreshold="-1.0" period="15" />
    <deploymentConstraints attribute="FreeMemory"
    expression="PercentMemoryFree*100" frequency="15" maxThreshold="-1.0"
    minThreshold="1.0" period="60" />
    <serviceLevels attribute="BusyThreadPercentage"
    expression="(ExecuteThreadTotalCount-
    ExecuteThreadIdleCount)*100/ExecuteThreadTotalCount" frequency="15"
    maxThreshold="20.0" minThreshold="5.0" period="30" />
    <serviceLevels attribute="PendingRequests"
    expression="PendingRequests" frequency="15" maxThreshold="20.0"
    minThreshold="5.0" period="30" />
</WebserverDomain>
</appMatrixRegister>
```

Figure 23:
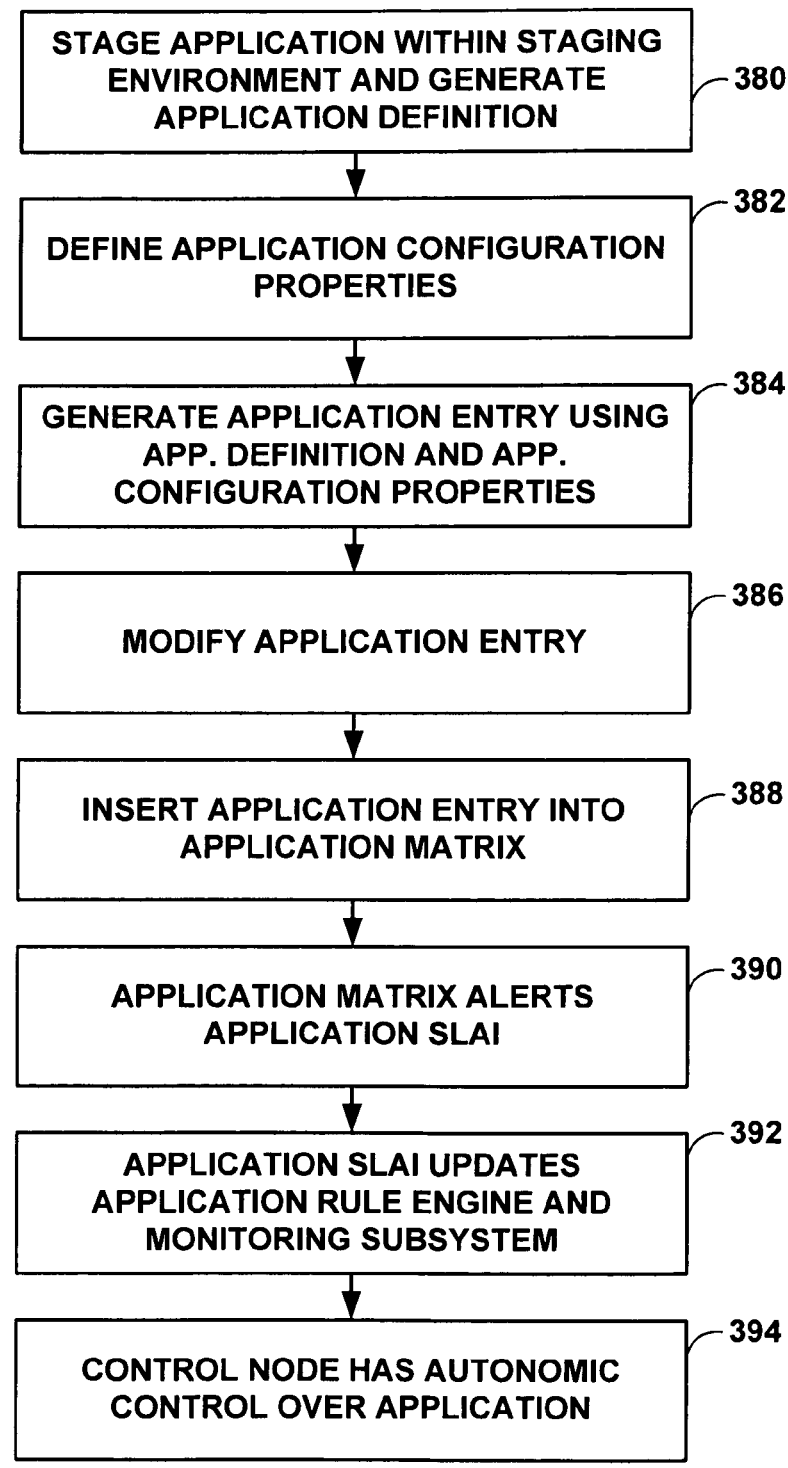
FIG. 23 is a block diagram illustrating an exemplary application matrix.

FIG. 23 is a flowchart illustrating an exemplary series of general steps that are performed to add an application to application matrix 350 in accordance with the principles of this invention. Administrator 20 first stages the application within a staging environment (380). Staging the application may include deploying the application on a desired image, creating a domain, specifying any services and external system connectivity (e.g., connections to databases, queues).

During this process, administrator 20 directs the application to generate an application definition file that represents an application-specific configuration based on the environment specified by the administrator. The application definition file contains information specific to an installation instance of the application. For example, the application definition file typically specifies the locations (paths) for all software components of the application as staged within the staging environment, a list of files to execute, connectivity information for the application, and other information that may be recorded by the configured application.

After staging the application, administrator 20 defines a set of application configuration properties that specify desired behavior of the application within distributed computing system 10 (382). Examples of such application configuration properties include a minimum number of nodes, minimum resource requirements for a node, deployment timing information, network addresses of tier node slots that are able to execute the application and other properties.

Next, administrator 20 directs configuration processor 354 to generate an application entry for the application using the application definition and the application configuration properties (384). The application entry contains configuration attributes that application governor 352 may use to interact with the application. In addition, the application entry may contain rule attributes that application rules engine 355 may use to define how control node 12 monitors the deployment and execution of the application within distributed computing environment 10.

After configuration processor 354 creates the application entry, administrator 20 may modify the application entry (386). In particular, administrator 20 may update start scripts or shell scripts for the application due to path changes between the staging environment and distributed computing system 10.

Once administrator 20 has finished modifying the application entry, administrator 20 inserts the application entry into application matrix 350 (388). Because application matrix 350 detects the insertion of the application entry, application matrix 350 sends an alert to application SLAI 358 (390).

In response to the alert, application SLAI 358 may update application rules engine 355 and monitoring subsystem 202 (392). For example, application SLAI 358 may automatically scan application matrix 350. If application SLAI 358 detects new rule attributes, application SLAI 358 may create local objects that reflect the new rule attributes in the working memory of application rules engine 355. In addition, if application SLAI 358 detects new monitored values, application SLAI 358 may update monitoring subsystem 202 to add new monitoring collectors 224 (FIG. 16).

After application SLAI 358 updates application rules engine 355 and monitoring subsystem 202, control node 12 has autonomic control over the deployment of applications to tiers based on the configuration of application matrix 350 (394). For example, control node 12 may deploy images, deploy applications, monitor the state of nodes and the execution of the applications, and apply tier-level rules as well as application-specific rules. Application SLAI 358 continues to listen for alerts from application matrix 350.

Figure 24:
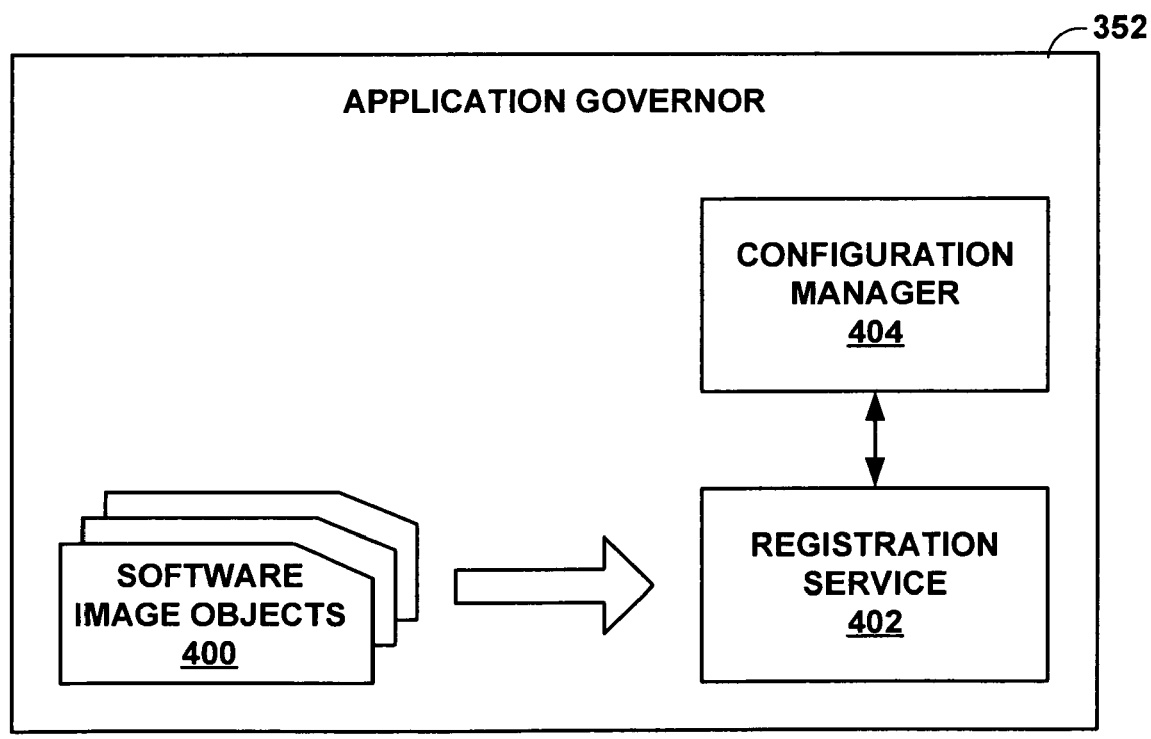
FIG. 24 is a block diagram illustrating an exemplary embodiment of application governor that utilizes image objects to manage deployment of applications.

FIG. 24 is a block diagram illustrating an exemplary embodiment of application governor 352 (FIG. 21). In this embodiment, application governor 352 includes a set of software image objects 400, a registration service 402, and a configuration manager 404. This embodiment of application governor 352 allows control node 12 to deploy instances of software units that constitute a software stack.

In distributed computing system 10, each of application nodes 14 may execute a stack of software applications to perform a service. A software stack is a hierarchical set of software applications that interact to perform the service. A software stack may be divided into a plurality of layers. A software application in one layer of a stack may use a software application in a lower layer of the stack to perform a service for a software application at a higher layer of the stack. For example, an operating system, a database application, and a web server application may constitute layers in a software stack. In this example, the database application may use a file system service provided by the operating system to retrieve information from a file in order to respond to a query from the web server application. Stated otherwise, software applications each layer of a software stack provide an execution environment for a software application at higher layer of the software stack. In the previous example, the operating system provides an execution environment for the first application and the first application provides an execution environment for the second application.

Each of software image objects 400 is a software module that provides a set of methods that allow a user of the software image objects to manipulate a software image. As used in this section, a software image is an image of one or more software applications at a time when the software applications are ready to be executed. For example, one software image may be an image of an operating system, a middleware application, and an application. In other example, one software image may be an image of just an operating system.

Each of software image objects 400 implement a common application programming interface (API) that defines the set of methods. For example, the API may include methods to create new instances of a software image, methods to destroy instances of a software image, methods to configure an execution environment to execute a software image, methods to start and stop the execution of a software image, and methods to reset a configuration of an execution environment after the execution environment has been configured to execute a software image. While each of software image objects 400 implement a common set of methods, each of the software image objects may implement the set of methods in different ways. For example, one of software image objects 400 may implement the set of methods to interact with a first software application while another one of software image objects 400 may implement the same set of methods differently in order to interact with a second software application. Nevertheless, because each of software image objects 400 implement the same API, application governor 352 may manipulate any software image in a common manner.

To create one of software image objects 400, administrator 20 may interact with an administrative interface of control node 12. For example, administrator 20 may request that control node 12 generate a software image object for a software unit that is installed on a device. Upon receiving the request from administrator 20, control node 12 may create a new software image object. Control node 12 may then assign a unique name to the software image object. This name may conform to a formal naming convention. For instance, names of software image objects may conform to the Java Management Extension Management Bean (JMX MBean) naming convention.

After assigning a unique name to the software image object, control node 12 may capture an image of the software application installed on a device. For example, control node 12 may capture the image of the software application by copying the portion of a hard disk drive of the device related to the software application. Control node 12 may then store the captured image in software image repository 26. In addition, control node 12 may set a parameter in the new software image object to indicate that the software image object is associated with newly captured image.

After control node 12 associates the image with the software image object, control node 12 may prompt administrator 20 to specify configuration parameters for the software application. Upon receiving the configuration parameters from administrator 20, control node 12 may store the software application-specific configuration parameters in the new software image object. Once administrator 20 specifies the configuration parameters for the software application, control node 12 may serialize the new software image object. For example, control node 12 may create a file that contains the new software image object.

After control node 12 serializes the new software image object, administrator 20 may provide the new software image object to application governor 352. For example, administrator 20 may copy a file that contains the new software image object into a deployment directory. When administrator 20 provides the new software image object to application governor 352, the software image object automatically registers itself with registration service 402. For instance, an executable registration script in the new software image object may automatically execute. When the registration script executes, the execution script provides the name of the new software image object to registration service 402. Registration service 402 may then incorporate the name of the new software image object into a list of registered software image objects. Registration service 402 is capable of registering a software image object associated with a software image of a software application during execution of another software image of the software application. As a result, control node 12 may expand the number of slots in a tier during execution of the software application. In one example embodiment, the names of software image objects may conform to the JMX MBean naming convention and registration service 402 may be a JMX MBean server. In addition to registering the name of the new software image object, registration service 402 may add the configuration parameters included in the software image object into application matrix 350. Administrator 20 may provide the new software image object to application governor 352 while distributed computing system 10 is operating.

After registration service 402 registers a software image object, application rules engine 355 may determine that distributed computing system 10 requires a certain number of instances of a software image of a software application. For example, application rules engine 355 may determine that there should be an instance of an image of an application for each slot in a tier associated with that application. Each instance of a software image of a software application is a separate copy of the software image of a software application. An instance of a software image may be individually deployed to an application node in distributed computing system 10. Because the instance is a separate copy of a software image, the instance may be modified independently of other instances of the same software image. For this reason, control node 12 may deploy an application multiple times with different configurations.

When application rules engine 355 determines that distributed computing system 10 requires an additional instance of an image of a software application, application rules engine 355 may send instructions to configuration manager 404 to create the instance of the image. In response to the instructions, configuration manager 404 may send a request to registration service 402 for a name of a software image object that provides methods to manipulate the software image of the software application. Configuration manager 404 may then use the name of the software image object to invoke a "createImageInstance" method of the software image object. The "createImageInstance" method creates a new instance of the software image in software repository 26 and returns to configuration manager 404 a new software image object. The new software image object may be used to manipulate the new instance of the software image. The "createImageInstance" method may be one of the methods defined by the common API implemented by the software image objects. When configuration manager 404 invokes the "createImageInstance" method of the software image object, the software image object may apply the service definition defined in application matrix 350 for the software application to the image. After receiving the new software image object, configuration manager 404 may register the new software image object with registration module 402.

During the operation of distributed computing system 10, application rules engine 355 may determine that an application node in the tier associated with a top-level software application should execute an instance of a top-level software application. In this situation, application rules engine 355 may send instructions to configuration manager 404 in application governor 352 to identify a stack of software applications that includes the top-level software application and to deploy the application node to this stack. In other words, application rules engine 355 instructs application governor 355 to identify a set of software applications that constitute a stack of software applications that, when executed, collaborate to provide an operating environment for the top-level software application. When configuration manager 404 receives the instructions from application rules engine 355, configuration manager 404 may identify software stacks that are capable of providing an execution environment for the top-level software application. For example, the top-level application may be designed for use with a Microsoft Windows operating system. In this example, configuration manager 404 may identify a first software stack in which a Microsoft Windows operating system executes on a Windows emulation program that executes on a Linux operating system. In this example, configuration manager 404 may also identify a second software stack in which a Microsoft Windows operating system executes on a Windows operating system. The top-level software application may execute on either of these two exemplary stacks.

After identifying possible software stacks that are capable of providing an execution environment for the top-level software application, configuration manager 404 may select one of the identified software stacks. Configuration manager 404 may select one of the identified software stacks based on one or more criteria. For example, configuration manager 404 may select one of the identified software stacks based on the cost of resources (e.g., latency of applications, consumption of memory, electrical power, etc.), the possibility of packing additional applications on the software stack, and so on. Next, configuration manager 404 may identify an appropriate application node that is able to host the selected software stack.

After identifying the application node, configuration manager 404 dynamically construct the selected stack. For example, configuration manager 404 may identify an unused instance of a software image of a software application at the bottom of the stack. Configuration manager 404 may then add the identified instance to the bottom of the stack. Next, configuration manager 404 may identify an unused instance of a software image of the next lowest software application in the stack. After identifying the instance, configuration manager 404 may invoke a "configureContainerResource" method of a software image object associated with the software unit to configure container resource (i.e., a "container resource") to execute the identified instance. In this case, the execution environment may comprise instances of software applications at a lower level of the stack. Configuration manager 404 may repeat this process for each level of the stack. In this way, configuration manager 404 may dynamically construct a stack of instances of images of software applications, each of which is configured to provide an execution environment for instance at a higher level of the stack.

To complete the deployment of the stack, configuration manager 404 may invoke a "startInterpretation" method of a software image object associated with an image of the software application at the lowest level of the stack. The "startInterpretation" method of a software image object instructs the execution environment of the application node to start the execution of the instance associated with the software image object. After configuration manager 404 starts the execution of the instance of the image of the software application at the lowest level of the stack, configuration manager 404 may invoke the "startInterpretation" method of an instance of an image of a software application at the next lowest level of the stack. Configuration manager 404 may continue invoking the "startInterpretation" method for instances at progressively higher levels of the stack until configuration manager 404 has invoked the "startInterpretation" method on all of the instances. In this way, configuration manager 404 may deploy instances of images of software applications in the selected software stack from the bottom of the selected software stack to the top of the selected software stack.

In another example of how configuration manager 404 may dynamically assemble a software stack, configuration manager 404 may identify a highest common instance of a software application that is shared by a stack currently executing on an application node and the selected software stack. If configuration manager 404 is able to identify such a highest common instance, configuration manager 404 may deploy to the application node each that is higher on the selected stack than the highest common instance. In this way, two software stacks may share instances executing on an application node.

After a software stack has been deployed to an application node, application rules engine 355 may determine that it is no longer necessary to execute some or all of the stack on the application node. When this occurs, application rules engine 355 may send instructions to configuration manager 404 to un-deploy each of the unneeded instances in the stack on the application node. Upon receiving the instructions, configuration manager 404 may invoke a "stopInterpretation" method of a software image object associated with an instance executing on the application node of an image of the highest-level software image instance of the stack to stop the execution of the instance. After invoking the "stopInterpretation" method, configuration manager 404 may invoke an "unconfigureContainerResource" method of the software image object associated with the instance. The "unconfigureContainerResource" method resets the execution environment to the configuration of the container resource prior to the invocation of the "configureContainerResource" method on the execution environment. After configuration manager 404 invokes the "unconfigureContainerResource" method, the instance may be redeployed to another application node and the execution environment may host a different instance. After un-deploying the highest-level software image instance from the stack, configuration manager 404 may repeat this process to un-deploy the software image instance that is now the highest level of the stack, and so on.

If application rules engine 355 determines that it is no longer necessary to maintain an instance of an image of a software application, application rules engine 355 may send instructions to configuration manager 404 to release the instance. In response to the instruction, configuration manager 404 may invoke a "releaseImageInstance" method of a software image object associated with the instance. The "releaseImageInstance" method destroys the instance and unregisters the software image object. Configuration manager 404 may generate an error if the "releaseImageInstance" method is invoked on a software image object associated with a software image instance that is currently deployed.

Each of software image objects 400 may implement the following exemplary interface:

```
public interface ImageObject {
    public ImageInstance createImageInstance(ServiceControl theService)
        throws CreateFailedException, MaxInstancesException;
    public ImageInstance restoreImageInstance(
            ServiceControl theService, String ImageInstanceId)
        throws NonExistentImageInstanceidException,
            ImageInstanceIdInUseException;
    public String getId( ) throws InvalidImageInstanceCallException;
    public void configureContainerResource(ResourceControl Container)
        throws ConfigContainerFailedException,
            InvalidImageInstanceCallException;
    public void startInterpretation( )
        throws StartFailedException, InvalidImageInstanceCallException;
    public void stopInterpretation( )
        throws StopFailedException, InvalidImageInstanceCallException;
    public void unconfigureContainerResource( )
        throws ContainerDownException,
            UnconfigContainerFailedException,
            InvalidImageInstanceCallException;
    public void releaseImageInstance( )
        throws InvalidImageInstanceCallException;
}
```

The embodiment of application governor 352 illustrated in the example of FIG. 24 may present several advantages. For instance, the embodiment provides a common, pluggable framework for supporting diverse software applications. Because each of software image objects 400 presents a common application programming interface, many parties may write software image objects to integrate new applications with distributed computing system 10. Such parties may include vendors of distributed computing systems, consultants, and partners. Furthermore, the use of software image objects 400 may allow control node 12 to deploy new instances of a software application during execution of the software application. The ability to add new instances of a software application during execution may obviate the need for manual configuration of tiers during tier creation. As a result, tiers may grow dynamically without requiring manual configuration.

In another example advantage, the example embodiment of application governor 352 illustrated in FIG. 24 may allow configuration of related applications. For example, application governor 352 may automatically configure a web service using information (e.g., a port and node list) obtained from an application server service. An object-based recursive component model may allow simple composition from smaller pieces.

The example embodiment of application governor 352 may also provide platform differentiation for services that are fungible (i.e., exchangeable). For a fungible application, such as an application server, this example embodiment may allow distributed computing system 10 to treat each application instance fungibly. The image object may mask the configuration differences required by the different base platforms such as Linux and Solaris.

Figure 25:
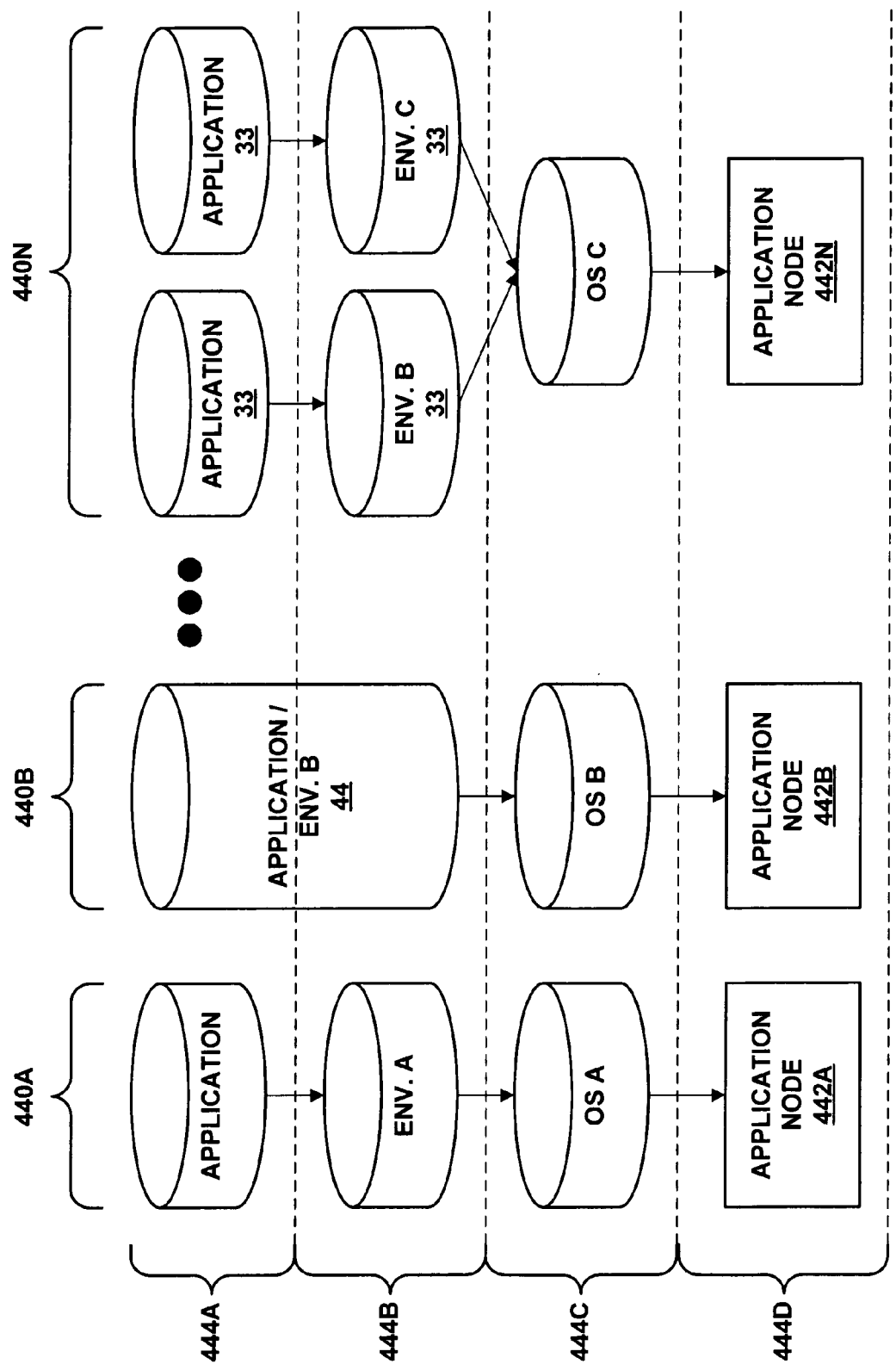
FIG. 25 is a block diagram illustrating an exemplary set of software stacks.

FIG. 25 is a block diagram illustrating an exemplary set of software stacks. The example of FIG. 25 illustrates software stacks 440A through 440N (collectively, "software stacks 440"). Each of software stacks 440 includes software applications at an application layer 444A, an execution environment layer 444B, an operating system layer 444C, and a hardware layer 444D. Software applications in application layer 444A execute in a software environment provided by software applications in execution environment layer 444B. Furthermore, software applications in execution environment layer 444B execute in a software environment provided by software applications in operating system layer 444C, and operating system layer 444C executes on hardware layer 444D. Other software stacks (not illustrated) may include other layers. For example, a software stack may include multiple layers of software applications. As one example, a hypertext preprocessor (PHP) software application may use services provided by a MySQL database management system. The MySQL database management system may use services provided by an Apache web server. The Apache web server may use services provided by a Linux operating system. This example software stack may provide an open-source solution for delivering complex web sites.

As illustrated in the example of FIG. 25, each of software stacks 440 executes on one of application nodes 442A through 442N (collectively, "application nodes 442"). Application nodes 442 may be application nodes in distributed computing system 10. Furthermore, each of application nodes 442 may utilize different architectures. For example, application node 442A may utilize an x86 processor architecture while application node 442B may utilize a Reduced Instruction Set Computer (RISC) architecture. Because application nodes 442 may utilize different architectures, some operating systems may be incompatible with one or more of application nodes 442. For example, a version of Microsoft Windows designed for use on an x86 processor may not function on a RISC processor.

The example of software stack 440B illustrates that multiple software layers may be integrated into a single software image. As illustrated in the example of FIG. 25, the application layer and the execution environment layer of software stack 440B are integrated into a single software image. Because the application layer and the execution environment layer are integrated, the application layer and the execution environment layer may be associated with a single software image object. Consequently, configuration manager 404 may invoke methods of the software image object associated with this single image object to configure an execution environment for the software image, start the software image, and so on.

The example of software stack 440N illustrates that multiple software stacks may exist on a single application node. That is, operating system C executes on application node 442N. In addition, operating environment B and operating environment C execute on operating system C. For example, operating environment B may be a Java Virtual Machine, operating environment may be a Windows emulator, and operating system C may be a Linux operating system. In this example, the Linux operating system may host both the Java Virtual Machine and the Windows emulator. In other stacks (not illustrated) multiple applications may execute on a single execution environment, multiple operating systems may execute on a single application node, and so on.

Although not illustrated in FIG. 25, each layer in a software stack may be composed of smaller, separately deployable software units. For example, an operating system unit may be composed of a core operating system unit and a plurality of software library units. Each of the software library units may include programs that are only needed by some applications. For example, one software library may facilitate communication of a computer network, a second software library may be a driver for a certain type of peripheral device, and so on. Because each of the software libraries include programs that only some applications need, configuration manager 404 might only deploy these software libraries to an application node when an application that uses these software libraries is to be deployed on that application node.

Potential advantages of this granular image assembly approach may include the flexibility in being able to install and configure software applications dynamically rather than rely on fixed sets of software applications. In addition, the advantages may include being able to choose a different computer on which to execute a software application based on various factors at the time the software application is to be executed. Further, this approach may reduce the number of preconfigured combinations of software applications that control node 12 manages.

Various embodiments of the invention have been described. These and other embodiments are within the scope of the following claims.

The invention claimed is:

1. A computer-implemented method comprising:
    automatically determining, with one or more processors, whether to execute a top-level software application on an application node in a set of application nodes in a distributed computing system based on status data from the set of application nodes;
    automatically identifying, with the one or more processors, sets of software applications, the sets of software applications comprising a first operating system and a second operating system, the first operating system different than the second operating system, wherein each of the sets of software applications comprises a stack of two or more software applications that, when executed, collaborate to provide an operating environment for the top-level software application, wherein the sets of software applications are identified when it is determined that the top-level software application is to be executed on the application node;
    automatically selecting, with the one or more processors, one of the identified sets of software applications based on at least one characteristic of the application node;
    deploying instances of each of the software applications in the selected set of software applications from the bottom to the top of the stack comprised by the selected set of software applications; and
    wherein automatically determining whether to execute top-level a software application comprises
    receiving status data for the distributed computing system, wherein the status data represents an actual state of the application nodes;

processing the status data with rules in a set of rule engines to determine whether causing the application node to execute an instance of the top-level software application would reduce differences between an expected state and the actual state of the distributed computing system; and directing an application governor to perform actions to identify the sets of software applications.

2. The computer-implemented method of claim 1, wherein identifying the sets of software applications comprises identifying a set of software image objects, wherein each of the software image objects is associated with a software application, and wherein each of the software image objects is a software module that provides a set of methods that control execution of an image of an associated software application.

3. The computer-implemented method of claim 2, wherein each of the software image objects implements a common application programming interface that defines the set of methods.

4. The computer-implemented method of claim 2, wherein the method further comprises:

capturing an image of a software application; and
associating the captured image with a software image object.

5. The computer-implemented method of claim 2, wherein the method further comprises automatically invoking a method of one of the software image objects to create a new instance of an image of a software application associated with the software image object.

6. The computer-implemented method of claim 5, wherein invoking the method comprises:

obtaining a name of the software image instance; and
using the name to invoke the method.

7. The computer-implemented method of claim 2, wherein the method further comprises automatically invoking a method of one of the software image objects to start execution of a software image associated with the software image object.

8. The computer-implemented method of claim 2, wherein the method further comprises adding a software image object to the set of software image objects while the application nodes are executing.

9. The computer-implemented method of claim 2, wherein the method further comprises automatically registering a software image object as one of the software image objects when the software image object is copied into a deployment directory.

10. The computer-implemented method of claim 2, wherein the software image objects are Java Management Beans.

11. The computer-implemented method of claim 1, wherein selecting one of the identified sets of software applications comprises selecting one of the identified sets of software applications based on costs of resources associated with the identified sets of software applications.

12. The computer-implemented method of claim 1, wherein the method further comprises sequentially configuring instances of software applications in the selected set of software applications to operate as execution environments for instances of the software applications at higher levels of the selected set of software applications, starting with an instance of a software application at a lowest-level of the selected set of software applications.

13. The computer-implemented method of claim 12, wherein sequentially configuring instances comprises invoking methods of software image objects associated with the instances of the software applications in order to configure the execution environments to execute the instances software applications.

14. The computer-implemented method of claim 1, wherein the method further comprises:

identifying a common highest-level software application in a set of software applications that is already executing on the application node; and
sequentially configuring instances of the software applications to operate as execution environments for instances of the software applications at higher levels of the selected set of software applications, starting with an instance of a software application at a lowest level of the selected set of software applications that has a level on the selected set of software applications that is higher than a highest-level common software resource.

15. The computer-implemented method of claim 1, wherein the method further comprises:

storing data that defines a model for a hierarchical organization of the distributed computing system, wherein the model specifies a fabric having one or more domains, and wherein each domain has at least one tier that includes at least one of the application nodes, and
wherein the rule engines produce the action requests to control whether the application node executes the software image instances in accordance with the hierarchical organization of the distributed computing system defined by the model.

16. A distributed computing system comprising:

an automation subsystem comprising at least one processor to determine whether to execute a top-level software application on an application node in a set of application nodes in a distributed computing system based on status data from the application nodes; and
an application governor comprising the at least one processor to automatically identify sets of software applications and to automatically select one of the identified sets of software applications based on at least one characteristic of the application node, the sets of software applications comprising a first operating system and a second operating system, the first operating system different than the second operating system,
wherein each of the sets of software applications constitutes a stack of two or more software applications that, when executed, collaborate to provide an operating environment for the top-level software application,
wherein the application governor identifies the sets of software applications when the application rules engine determines that the top-level software application is to be executed on the application node,
wherein the application node executes instances of each of the software applications in the selected set of software applications from the bottom to the top of the stack comprised by the selected set of software applications;
a monitoring subsystem comprising the at least one processor that collects the status data from the application nodes and communicates the status data to the automation subsystem, wherein the status data represents an actual state for the application nodes; and
a business logic tier comprising the at least one processor that provides expected state data to the automation subsystem, wherein the expected state data represents an expected state for the application nodes,
wherein the automation subsystem analyzes the status data from the monitoring subsystem to determine whether causing the application node to execute an instance of the top-level software application would reduce differences between the actual state and the expected state.

17. The distributed computing system of claim 16, wherein the distributed computing system further comprises a set of software image objects, wherein each of the software image objects is associated with a software application, wherein each of the software image objects is a software module that provides a set of methods that control execution of an image of an associated the software application, and wherein the application governor identifies a software image object for each software application in the selected set of software applications.

18. The distributed computing system of claim 17, wherein each of the software image objects implements a common application programming interface that defines the set of methods.

19. The distributed computing system of claim 17, wherein the application governor automatically invokes a method of one of the software image objects to create a new instance of an image of a software application associated with the software image object.

20. The distributed computing system of claim 19, wherein the application governor comprises a registration service to register names of the software image objects; and wherein the application governor invokes the method by obtaining a name of the software image object from the registration service and by using the name of the software image object to invoke the method.

21. The distributed computing system of claim 20, wherein the registration service is capable of registering a software image object associated with a software image of a software application during execution of another software image of the software application.

22. The distributed computing system of claim 17, wherein the application governor automatically invokes a method of one of the software image objects to start execution of a software image associated with the software image object.

23. The distributed computing system of claim 16, wherein the application governor identifies a common highest-level software application in the selected set of software applications that is already deployed to the application node and sequentially configures instances of the software applications to operate as execution environments for instances of the software applications at higher levels of the selected set of software applications, starting with an instance of a software application at a lowest level of the selected set of software applications that has a level on the selected set of software applications that is higher than a highest-level common software resource.

24. The distributed computing system of claim 16, further comprising:

a database to store data that defines a model for a hierarchical organization of the distributed computing system, wherein the model specifies a fabric having one or more domains, and wherein each domain has at least one tier that includes at least one of the application nodes, wherein the automation subsystem produces action requests to control whether the application nodes execute instances of software applications in accordance with the hierarchical organization of the distributed computing system defined by the model.

25. A non-transitory, computer-readable medium comprising instructions stored therein that cause a programmable processor to:

automatically determine whether to execute a top-level software application on an application node in a set of application nodes in a distributed computing system based on status data from the application nodes;

automatically identify sets of software applications, the sets of software applications comprising a first operating system and a second operating system, the first operating system different than the second operating system, wherein each of the sets of software applications constitutes a stack of two or more software applications that, when executed, collaborate to provide an operating environment for the top-level software application, wherein the sets of software applications are identified when it is determined that the top-level software application is to be executed on the application node;

automatically select one of the identified sets of software applications based on at least one characteristic of the application node;

automatically instruct the application node to execute instances of each of the software applications in the selected set of software applications from the bottom to the top of the stack comprised by the selected set of software applications;

wherein automatically determine whether to execute top-level a software application comprises receive status data for the distributed computing system, wherein the status data represents an actual state of the application nodes;

process the status data with rules in a set of rule engines to determine whether causing the application node to execute an instance of the top-level software application would reduce differences between an expected state and the actual state of the distributed computing system; and direct an application governor to perform actions to identify the sets of software applications.

26. The non-transitory, computer-readable medium of claim 25, wherein the instructions cause the programmable processor to identify the sets of software applications by causing the programmable processor to identify a set of software image objects, wherein each of the software image objects is associated with a software application, and wherein each of the software image objects is a software module that provides a set of methods that control execution of an image of an associated software application.

* * * * *